(12) United States Patent
Murao et al.

(10) Patent No.: US 11,966,400 B2
(45) Date of Patent: Apr. 23, 2024

(54) COMMON DATABASE ARCHITECTURE TO SUPPORT LARGESCALE TRANSACTIONS AND NODE ARCHIVAL ON A MAAS PLATFORM

(71) Applicant: SONY GROUP CORPORATION, Tokyo (JP)

(72) Inventors: Sadayoshi Murao, Bangalore (IN); Madhvesh Sulibhavi, Bangalore (IN); Takashi Togame, Bangalore (IN); Srinivasa Pingili, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 356 days.

(21) Appl. No.: 17/178,185

(22) Filed: Feb. 17, 2021

(65) Prior Publication Data

US 2021/0256027 A1 Aug. 19, 2021

Related U.S. Application Data

(60) Provisional application No. 62/978,137, filed on Feb. 18, 2020.

(51) Int. Cl.
*G06F 16/2455* (2019.01)
*G06F 16/23* (2019.01)
(Continued)

(52) U.S. Cl.
CPC .... *G06F 16/24556* (2019.01); *G06F 16/2365* (2019.01); *G06F 16/24552* (2019.01);
(Continued)

(58) Field of Classification Search
None
See application file for complete search history.

(56) References Cited

U.S. PATENT DOCUMENTS 11,003,690 B1 * 5/2021 O'Shea ............... G06F 16/113
2003/0217079 A1 11/2003 Bakalash
(Continued)

FOREIGN PATENT DOCUMENTS

WO WO-2013155532 A2 10/2013
WO 2018/125989 A2 7/2018

OTHER PUBLICATIONS

Hogan et al. "Can a Blockchain-Based Maas Create Business Value?" 2019, (Year: 2019).*
(Continued)

*Primary Examiner* — Yu Zhao
(74) *Attorney, Agent, or Firm* — CHIP LAW GROUP

(57) ABSTRACT

A system, including a plurality of node packages, an aggregator database node, and an archival database node, is provided. Each node package includes a subscriber node, an MP node, and a MaaS node. A first MaaS node selects a first set of transaction records from the first MaaS node based on a first data retention threshold and a first storage duration, and transmits the first set of transaction records to the aggregator database node for storage. The first MaaS node further controls a selection of a second set of transaction records from a third set of transaction records stored on the aggregator database node and controls a transmission of the second set of transaction records to the archival database node for storage. The selection of the second set of transaction records is based on a second data retention threshold and a second storage duration.

18 Claims, 9 Drawing Sheets

(51) Int. Cl.
*G06F 16/248* (2019.01)
*G06Q 20/06* (2012.01)
*G06Q 20/40* (2012.01)

(52) U.S. Cl.
CPC ....... *G06F 16/248* (2019.01); *G06Q 20/0658* (2013.01); *G06Q 20/401* (2013.01)

(56) References Cited

U.S. PATENT DOCUMENTS

| | | |
|---|---|---|
| 2011/0078199 A1 | 3/2011 | Williamson |
| 2013/0204894 A1 | 8/2013 | Faith |
| 2014/0279929 A1 | 9/2014 | Gupta |
| 2016/0330180 A1 | 11/2016 | Egorov |
| 2018/0096752 A1* | 4/2018 | Ovalle ............... H01B 3/46 |
| 2019/0027237 A1 | 1/2019 | McFarlane |
| 2020/0005403 A1* | 1/2020 | Patterson ........... G06Q 20/10 |

OTHER PUBLICATIONS

Thijs De Wilde, "Thesis Mobility as a Service (MaaS) meets Blockchain", Research gate, Jan. 2019, 110 pages.
Nguyen, Tri Hong et al., "Blockchain-Based Mobility-as-a-Service", Proceedings of the 28th International Conference on Computer Communication and Networks, Jul. 29, 2019, pp. 1-6.

* cited by examiner

400A

| First MaaS Node 118A | | Aggregator Database Node 122 | | Archival Database Node 124 | |
|---|---|---|---|---|---|
| Transaction Record | Storage Duration | Transaction Record | Storage Duration | Transaction Record | Storage Duration |
| 1. TR01 | 10 hours | 1. TR12 | 4 hours | | |
| 2. TR02 | 15 hours | 2. TR13 | 7 hours | | |
| 3. TR03 | 20 hours | | | | |
| 4. TR04 | 1 day | | | | |
| 5. TR05 | 2 days | | | | |
| 6. TR06 | 2 days 1 hour | | | | |
| 7. TR07 | 2 days 6 hours | | | | |
| 8. TR08 | 2 days 8 hours | | | | |
| 9. TR09 | 3 days 2 hours | | | | |
| 10. TR10 | 3 days 10 hours | | | | |
| 11. TR11 | 3 days 18 hours | | | | |

| First MaaS Node 118A | | Aggregator Database Node 122 | | Archival Database Node 124 | |
|---|---|---|---|---|---|
| Transaction Record | Storage Duration | Transaction Record | Storage Duration | Transaction Record | Storage Duration |
| 1. TR01 | 10 hours | 1. TR12 | 4 hours | | |
| 2. TR02 | 15 hours | 2. TR13 | 7 hours | | |
| 3. TR03 | 20 hours | | | | |
| 4. TR04 | 1 day | | | | |
| 5. TR05 | 2 days | | | | |
| 6. TR06 | 2 days 1 hour | | | | |
| 7. TR07 | 2 days 6 hours | | | | |
| 8. TR08 | 2 days 8 hours | | | | |
| 9. TR09 | 3 days 2 hours | | | | |
| 10. TR10 | 3 days 10 hours | | | | |
| 11. TR11 | 3 days 18 hours | | | | |
| 1. TR01 | 10 hours | 1. TR09 | 0 hours | | |
| 2. TR02 | 15 hours | 2. TR10 | 0 hours | | |
| 3. TR03 | 20 hours | 3. TR11 | 0 hours | | |
| 4. TR04 | 1 day | 4. TR12 | 4 hours | | |
| 5. TR05 | 2 days | 5. TR13 | 7 hours | | |
| 6. TR06 | 2 days 1 hour | | | | |
| 7. TR07 | 2 days 6 hours | | | | |
| 8. TR08 | 2 days 8 hours | | | | |

| First MaaS Node 118A | | Aggregator Database Node 122 | | Archival Database Node 124 | |
|---|---|---|---|---|---|
| Transaction Record | Storage Duration | Transaction Record | Storage Duration | Transaction Record | Storage Duration |
| 1. TR14 | 15 hours | 1. TR01 | 56 days 2 hours | | |
| 2. TR15 | 17 hours | 2. TR02 | 56 days 2 hours | | |
| 3. TR16 | 22 hours | 3. TR03 | 56 days 2 hours | | |
| 4. TR17 | 1 day 12 hours | 4. TR04 | 57 days 2 hours | | |
| 5. TR18 | 2 days | 5. TR05 | 58 days 2 hours | | |
| 6. TR19 | 2 days 10 hours | 6. TR06 | 58 days 2 hours | | |
| 7. TR20 | 2 days 16 hours | 7. TR07 | 58 days 2 hours | | |
| | | 8. TR08 | 59 days 2 hours | | |
| | | 9. TR09 | 60 days 2 hours | | |
| | | 10. TR10 | 60 days 2 hours | | |
| | | 11. TR11 | 60 days 2 hours | | |
| | | 12. TR12 | 60 days 6 hours | | |
| | | 13. TR13 | 60 days 9 hours | | |
| 1. TR14 | 15 hours | 1. TR01 | 56 days 2 hours | 1. TR09 | 0 hours |
| 2. TR15 | 17 hours | 2. TR02 | 56 days 2 hours | 2. TR10 | 0 hours |
| 3. TR16 | 22 hours | 3. TR03 | 56 days 2 hours | 3. TR11 | 0 hours |
| 4. TR17 | 1 day 12 hours | 4. TR04 | 57 days 2 hours | 4. TR12 | 0 hours |
| 5. TR18 | 2 days | 5. TR05 | 58 days 2 hours | 5. TR13 | 0 hours |
| 6. TR19 | 2 days 10 hours | 6. TR06 | 58 days 2 hours | | |
| 7. TR20 | 2 days 16 hours | 7. TR07 | 58 days 2 hours | | |
| | | 8. TR08 | 59 days 2 hours | | |

FIG. 4C

COMMON DATABASE ARCHITECTURE TO SUPPORT LARGESCALE TRANSACTIONS AND NODE ARCHIVAL ON A MAAS PLATFORM

CROSS-REFERENCE TO RELATED APPLICATIONS/INCORPORATION BY REFERENCE

This application claims priority to U.S. Provisional Patent Application Ser. No. 62/978,137 filed on Feb. 18, 2020, the entire content of which is hereby incorporated herein by reference.

FIELD

Various embodiments of the disclosure relate to mobility-as-a-service (MaaS) and distributed ledger technology. More specifically, various embodiments of the disclosure relate to a system and method for support of largescale transactions and node archival on a MaaS platform based on common database architecture.

BACKGROUND

In a Mobility-as-a-Service (MaaS) platform, multiple mobility providers may provide their services through infrastructures, which may be based on a closed platform. Each of such mobility provider may have a separate ticket processing infrastructure (e.g., ticketing gates and Point-of-Sale (PoS) devices) or a separate application (e.g., a ticket booking application, ticket processing application, and a ride hailing application) to create, pay for, or manage a trip.

On such MaaS platform, there may be a large amount of transaction message flow between various nodes of the MaaS platform due to the sheer number of nodes of the MaaS platform and due to large amount of users that may be served by the MaaS platform at any given time. For example, the various nodes of the MaaS platform may be associated with a large number of homogeneous and heterogenous mobility players across the MaaS platform. Each mobility player of the MaaS platform may have a large amount of users associated with it, thereby generating the large amount of the transaction message flows. This may lead to a generation of a large amount of transaction records on the MaaS platform. The storage and management of such large amount of transaction records on the MaaS platform may be difficult. Moreover, the management of historic data (such as historic transaction records) for long duration on distributed ledger systems, such as the MaaS platforms may be cumbersome and may slowdown the operations.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for support of largescale transactions and node archival on a mobility-as-a-service (MaaS) platform based on common database architecture is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 4A, 4B, and 4C collectively depict exemplary scenarios for support of largescale transactions and node archival on a MaaS platform based on common database architecture, in accordance with an embodiment of the disclosure.

DETAILED DESCRIPTION

Figure 1:
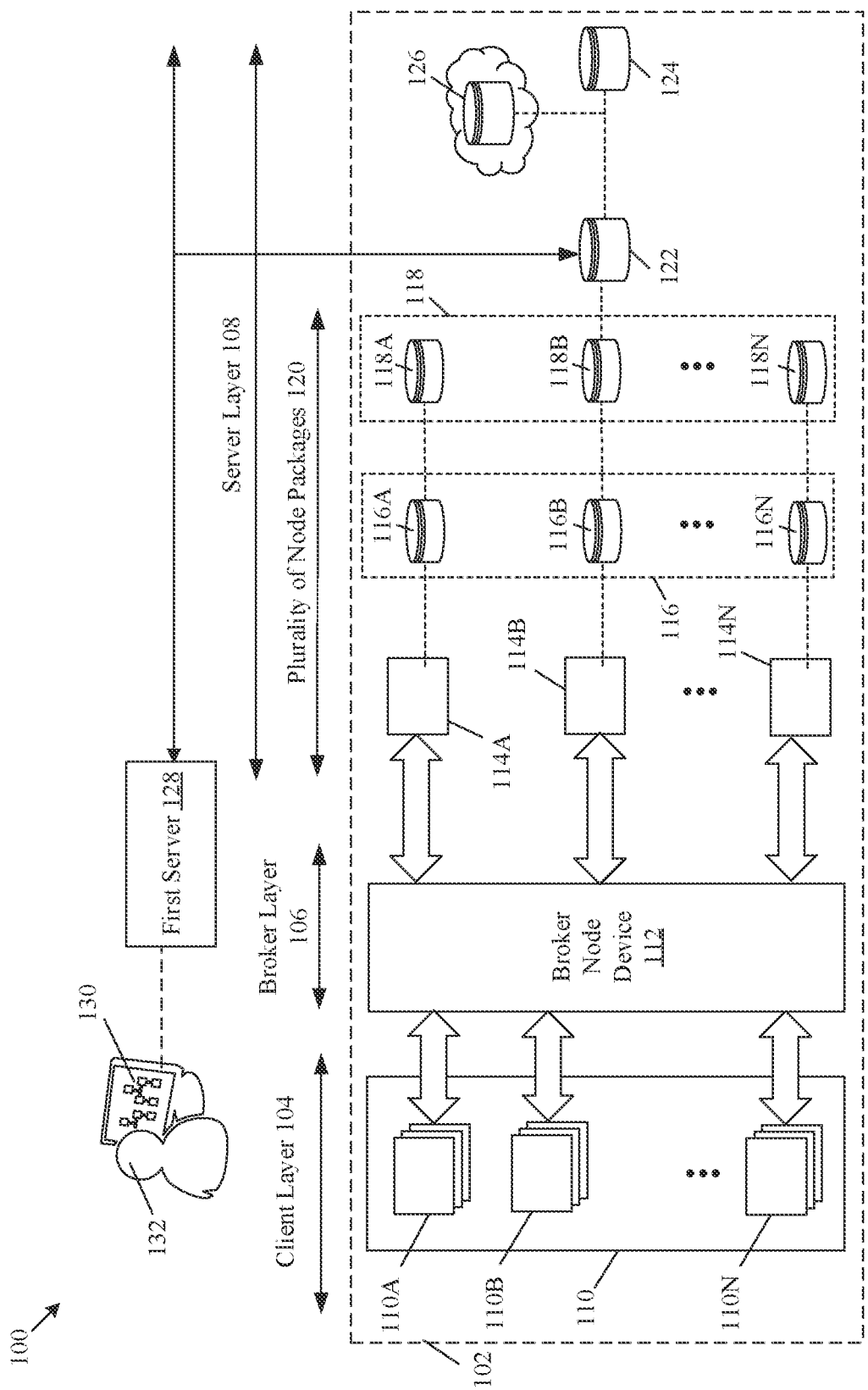
FIG. 1 is a diagram of an exemplary network environment for support of largescale transactions and node archival on a mobility-as-a-service (MaaS) platform based on common database architecture, in accordance with an embodiment of the disclosure.

The following described implementations may be found in the disclosed system and method for management of transaction records for aggregation and archival on a Mobility-as-a-Service (MaaS) network. The disclosed system may be a part of a federated transportation management system that may facilitate multiple homogeneous or heterogenous mobility providers and their infrastructure, such as ticketing gates, applications, and/or Point of Sale (PoS) devices to operate on the MaaS network to provide various mobility services. Each mobility provider may have secure data ownership and may control co-use of relevant transaction records through a distributed ledger. This may enhance connectivity between the various mobility providers. The system may further enhance handling of revenue sharing models, roaming management and contract management between the different mobility providers, based on the controlled co-use of the relevant transaction records through the distributed ledger.

Exemplary aspects of the disclosure provide a system that may include a plurality of node packages associated with a MaaS network. Each of the plurality of node packages may include a subscriber node, a mobility provider (MP) node of a first distributed ledger and a MaaS node of a second distributed ledger. The MaaS network may further include a plurality of publisher nodes and a broker node device. One or more nodes associated with the MaaS network may be configured to handle a plurality of transaction records associated with a trip plan of a sequence of trip plans included in a MaaS mobility service. The transaction records may further be associated with a travelling user (such as a roaming user). The plurality of transaction records may be associated with information, such as, but not limited to, ticketing information, subscription information, payment information, revenue sharing information, or mobility service information. Each of the plurality of transaction records may be associated with a transaction message received by the subscriber node (such as, a first subscriber node) of a first node package of the plurality of node packages. The transaction message may be received by the subscriber node from a publisher node (such as, a first publisher node of the plurality of publisher nodes), via the broker node device.

The disclosed system may further include an aggregator database node and an archival database node. The aggregator database node may be communicatively coupled to each of the plurality of node packages and the archival database node may be communicatively coupled to the aggregator database node. A first MaaS node of the first node package from the plurality of node packages may be configured to select a first set of transaction records from the plurality of transaction records stored on the first MaaS node. The first set of transaction records may be selected from the plurality of transaction records based on a first data retention threshold and a first storage duration of each of the first plurality of transaction records on the first MaaS node.

The first MaaS node of the first node package may further be configured to transmit the selected first set of transaction records to the aggregator database node for storage at the aggregator database node. The selected first set of transaction records may be transmitted to the aggregator database node from the first MaaS node, based on a completion of the first storage duration of the first set of transaction records in the first MaaS node. For example, the first data retention threshold may be three days. Thus, after storage of the first set of transaction records for three days in the first MaaS node, the first set of transaction records may be transmitted to the aggregator database node.

The first MaaS node may be further configured to invalidate (or deactivate i.e. soft-delete) the selected first set of transaction records from the first MaaS node based on the transmission of the selected first set of transaction records to the aggregator database node. Thus, older transaction records from the first plurality of transaction records may be invalidated in the first MaaS node and may still be kept in the aggregator database node for any further use.

In accordance with an embodiment, the first MaaS node may be further configured to control a selection of a second set of transaction records from a third set of transaction records stored on the aggregator database node. The selection of the second set of transaction records may be based on a second data retention threshold and a second storage duration of each of the third set of transaction records stored on the aggregator database node. The third set of transaction records may include the first set of transaction records that may be received by the aggregator database node from the first MaaS node. The third set of transaction records in the aggregator database node may include the first set of transaction records and other transaction records (which may be newer or older than the first set transaction records) already stored on the aggregator database node. The second data retention threshold may be, for example, sixty days. The aggregator database node may further transmit the selected second set of transaction records to the archival database node for storage at the archival database node. Thus, after storage of the second set of transaction records for sixty days in the aggregator database node, the second set of transaction records may be transmitted to the archival database node.

In contrast to conventional systems that may store all transaction records on a same database (for example related to MAAS network) for an entire time duration that the transaction records need to be stored, the disclosed system provides a selection of older transaction records that may be stored on a MaaS node. The selection of the older transaction records on the MaaS node may be based on a storage threshold (for example the first data retention threshold) of the MaaS node and a duration of storage of such older transaction records on the MaaS node. The selected older transaction records may be moved to the aggregator database node for storage at the aggregator database node. Further, the transaction records may be stored at the aggregator database node for a certain time duration based on a storage threshold (for example the second data retention threshold) of the aggregator database node. The transaction records whose duration of storage on the aggregator database node exceed the storage threshold of the aggregator database node may be further moved to the archival database node for storage on the archival database node. The storage thresholds of the aggregator database node and the archival database node may be configured in such a manner that the MaaS node may store a limited number of transaction records at any given time, as the other transaction records may be sequentially migrated to the aggregator database node and the archival database node. Such regular migration may improve the storage and management of large scale transaction records in the MaaS network. Further, as a limited number of transaction records may be stored at the MaaS node at any given time (based on the storage thresholds), a delay in processing of transactions associated with the transaction records stored on the MaaS node may be minimized.

Further, the aggregator database node may provide support for non-real-time transaction processing, across the MaaS network and the various mobility providers of the MaaS network. For example, the aggregator database node may include transaction records of a month of all mobility providers across the MaaS network. Such transaction records may be collated for consolidation of ticket transactions (e.g., for closure of monthly transactions), and calculation of revenue shares associated with the different mobility providers and an organization that manages the MaaS network itself. Moreover, the archival database node may store a large amount of transaction records for longer periods of time to support audit and compliance of the transactions associated with such transaction records stored for the long term (for example, the transaction records may be stored on the archival database node for 3-5 years, as may be required by different regulatory authorities). Further, the archival database node may also support analytics and visualization of the large-scale transaction records associated with the MaaS network through an administrator system associated with the MaaS network, as may be required for management of the MaaS network.

FIG. 1 is a diagram of an exemplary network environment for support of largescale transactions and node archival on a mobility-as-a-service (MaaS) platform based on common database architecture, in accordance with an embodiment of the disclosure. With reference to FIG. 1, there is shown a block diagram of a network environment 100. The network environment 100 may include a first MaaS network 102, which may be associated with a publish-subscribe pattern. The first MaaS network 102 may include a first plurality of nodes, which may be configured in layers, such as a client layer 104, a broker layer 106, and a server layer 108. The first plurality of nodes may include a plurality of publisher nodes 110 in the client layer 104; and a broker node device 112 in the broker layer 106. The first plurality of nodes may further include a first plurality of subscriber nodes 114A, 114B, . . . 114N, a plurality of mobility-provider (MP) nodes 116A, 116B, . . . 116N of a first distributed ledger, a plurality of MaaS nodes 118A, 118B, . . . 118N of a second distributed ledger, an aggregator database node 122, an archival database node 124, and a cache database node 126 in the server layer 108. The first plurality of subscriber nodes 114A, 114B, . . . 114N, the plurality of MP nodes 116A, 116B, . . . 116N, and the plurality of MaaS nodes 118A, 118B, . . . 118N may collectively form plurality of node packages 120 of the first MaaS network 102. For example, a first node package of the plurality of node packages 120 may include a first subscriber node 114A, a first MP node 116A, and a first MaaS node 118A. In another example, a second node package of the plurality of node packages 120 may include a second subscriber node 114B, a second MP node 116B, and a second MaaS node 118B. The aggregator database node 122 may be communicatively coupled to the plurality of node packages 120. The archival database node 124 may be communicatively coupled to the aggregator database node 122. The plurality of publisher nodes 110 in the client layer 104 may be configured to communicate with the first plurality of subscriber nodes 114A, 114B, . . . 114N through the broker node device 112.

Though a single broker node device 112 is shown in FIG. 1, the scope of the disclosure may not so be limited. In an embodiment, the network environment 100 may include more than one broker node device 112, without departure from the scope of the disclosure. In another embodiment, the network environment 100 may include an intelligent broker node that may include a functionality of one or more broker node devices.

The plurality of publisher nodes 110 may include a first publisher node 110A, a second publisher node 110B, . . . and an Nth publisher node 110N. The first plurality of subscriber nodes 114A, 114B, . . . 114N may include a first subscriber node 114A, a second subscriber node 114B, . . . and an Nth subscriber node 114N. In an embodiment, each of the first plurality of subscriber nodes 114A, 114B, . . . 114N may be interfaced with the broker node device 112 through a plug-in for communication of data (e.g., transaction messages). Each of the first plurality of subscriber nodes 114A, 114B, . . . 114N may be associated with a respective MP node and MaaS node. For example, the first subscriber node 114A may be associated with each of a first MP node 116A and a first MaaS node 118A. Further, the second subscriber node 114B may be associated with each of a second MP node 116B and a second MaaS node 118B. Similarly, the Nth subscriber node 114N may be associated with each of an Nth MP node 116N and an Nth MaaS node 118N.

The network environment 100 may further include a first server 128, an administrator device 130, which may be operated by an administrator 132 of the first MaaS network 102. In the network environment 100, there may further be a user (not shown) who may interact with the plurality of publisher nodes 110 to avail mobility services from different mobility providers of the first MaaS network 102.

The first MaaS network 102 may include a network of nodes, such as, the first plurality of nodes which may be configured to operate in the client layer 104, the broker layer 106, and the server layer 108. The first MaaS network 102 may handle transactions (such as the transaction messages) for a MaaS mobility service associated with multiple mobility providers. Each of such mobility providers may own, lease, or manage a cluster of nodes in each of the client layer 104 and the server layer 108 of the first MaaS network 102. For example, the first publisher node 110A, the first subscriber node 114A, and the first MP node 116A may be associated with a first mobility provider. The second publisher node 110B, the second subscriber node 114B, and the first MP node 116A may be associated with a second mobility provider which may be different from the first mobility provider.

In some embodiments, the first MaaS network 102 may support an open standard specification for MaaS. In such a case, the plurality of publisher nodes 110 (e.g., ticket readers or sensor devices) of different companies associated with various mobility providers of the first MaaS network 102 may join the first MaaS network 102 as homogeneous publisher nodes. Additionally, legacy ticket readers or sensor devices may connect to the first MaaS network 102 based on leverage of standard communication protocols, such as, a Message Queuing Telemetry Transport (MQTT)-based messaging protocol, an Advanced Message Queuing Protocol (AMQP)-based messaging protocol, or a Message-Oriented Middleware (MOM)-based messaging framework. By use of standard communication protocols, the first MaaS network 102 may provide ticket roaming functionality to the users. For example, a ticket reader of any mobility provider may scan an electronic ticket of a user for a MaaS mobility service and may provide the respective mobility service of the mobility provider to the user (irrespective of the issuer of the ticket) based on seamless and secure access of the first MaaS network 102.

In accordance with an embodiment, each of the plurality of MP nodes 116A, 116B, . . . 116N may be associated with a separate mobility provider of the first MaaS network 102. The MaaS mobility service may be provided by homogeneous mobility providers (such as multiple cab ride provider companies or multiple rail companies) or heterogenous mobility providers through a homogenous group of devices, applications, or ticketing gates, or a heterogenous group of ticketing gates, applications, and Point of Sale (PoS) devices. The MaaS mobility service may be a combination of individual service offerings of one or more homogenous or heterogeneous mobility providers. The MaaS mobility service may include, for example, a train service, a bus service, a taxi/cab service, a metro rail service, an air-plane service, a fleet service, a ride hailing service, a car sharing service, a carpool service, a car rental service, a bike sharing service, or a combination thereof.

Each of the plurality of publisher nodes 110A, 110B, . . . 110N may include a suitable logic, circuitry, code, and/or interface that may be configured to operate as a ticket processing client for a mobility service of a respective mobility provider. For example, as a ticket processing client, each of the first publisher node 110A, the second publisher node 110B, . . . and the Nth publisher node 110N may read, issue, recharge, or cancel tickets to create events associated with a respective mobility service. Based on such events, transaction messages may be generated by each of the first publisher node 110A, the second publisher node 110B, . . . and the Nth publisher node 110N and the generated transaction messages may be communicated to one or more subscriber nodes of the first MaaS network 102 or other MaaS networks, through the broker node device 112. Examples of a publisher node may include, but are not limited to, a consumer electronic device with a trip planning or booking application, a ticket reader on a ticketing gate, a ticketing kiosk a Point-of-Sale (PoS) device, a mobile POS, a ticket vending machine, a smart door of a transport vehicle which may read a ticket to start or end a ride.

The broker node device 112 may include suitable logic, circuitry, code, and/or interfaces that may be configured to route transaction messages from a publisher node (such as, the first publisher node 110A) to a suitable node, such as a subscriber node (such as, the first subscriber node 114A). The broker node device 112 may be configured to communicate with each of the plurality of publisher nodes 110A, 104B, . . . 104N and each of a first plurality of subscriber nodes 114A, 114B, . . . 114N through a suitable publish-subscribe network protocol, such as but not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework. Example implementations of the broker node device 112 may include, but are not limited to, an application server, a cloud server, a mainframe server, a database server, a web server, or other type of servers.

Each of the first plurality of subscriber nodes 114A, 114B, . . . 114N may include suitable logic, circuitry, code, and/or interfaces that may be configured to receive the transaction messages through the broker node device 112 from one or more of the plurality of publisher nodes 110A, 110B, . . . 110N. In an embodiment, each of the first plurality of subscriber nodes 114A, 114B, . . . 114N may be interfaced with the broker node device 112 through a plug-in for communication of data (e.g., transaction messages). Each transaction message may include a topic which may be subscribed by one or more subscriber nodes of the first plurality of subscriber nodes 114A, 114B, . . . 114N. Example implementations of a subscriber node may include, but are not limited to, a web server, an edge device, an edge node, a cloud server, a cluster of cloud-based servers, a workstation, or any computing device with a fog or cloud computing capability.

Each of MP nodes 116A, 116B, . . . 116N may include suitable logic, circuitry, code, and/or interfaces that may be configured to store transaction records associated with a respective mobility provider. For example, the first MP node 116A may store transaction records associated with a first mobility provider. In an embodiment, each transaction records stored on each MP node may be associated with a two-party transaction. For example, the transaction records stored on an MP node of a certain mobility provider may be associated with transactions that may involve the mobility provider and a MaaS provider. The transaction records may include records of trips of users. Each trip may correspond to a mobility service that may be provided by the first mobility provider in at least one way of the journey. Each of the MP nodes 116A, 116B, . . . 116N may be referred to as nodes of a distributed ledger 116 (such as the first distributed ledger) that may store transaction records of the various mobility providers of the first MaaS network 102. In an embodiment, each MP node may be implemented as one of, but not limited to, an edge device, an edge node, or a distributed ledger node with a fog or cloud computing capability.

Each of the MaaS nodes 118A, 118B, . . . 118N may include suitable logic, circuitry, code, and/or interfaces that may be configured to store the transaction records associated with all mobility providers of the first MaaS network 102. The storage of the transaction records associated with each of the mobility providers may be used to settle transactions of trips amongst the mobility providers that offer mobility services to users. In an embodiment, each transaction records stored on each MaaS node may be associated with a multi-party transaction. For example, the transaction records stored on a MaaS node may be associated with transactions that may involve one or more mobility providers of the first MaaS network 102 and the MaaS provider. In such case, the MP node and the MaaS node may store same transaction. Each of the MaaS nodes 118A, 118B, . . . 118N may correspond to nodes of a distributed ledger 118 (such as the second distributed ledger) that may store transaction records associated with the first MaaS network 102. In an embodiment, each MaaS node may be implemented as one of, but not limited to, an edge device, an edge node, or a distributed ledger node with a fog or cloud computing capability.

In an embodiment, one or more of the plurality of node packages 120 may include a subscriber node, a plurality of MP nodes of the first distributed ledger, and a MaaS node of the second distributed ledger. For example, the first node package of the plurality of node packages 120 may include the first subscriber node 114A, the first MP node 116A, the second MP node 116B, and the first MaaS node 118A. In another example, the second node package may include, the second subscriber node 114B, the first MP node 116A, and the second MaaS node 118B. In another example, the third node package may include a third subscriber node 114C, the first MP node 116A, the second MP node 116B and the third MaaS node 118C. Each of the plurality of MP nodes may be associated with a separate mobility provider of the first MaaS network 102. In an example, the first MP node 116A may be associated with the first mobility provider (e.g., a taxi service provider) and the second MP node 116B may be associated with the second mobility provider (e.g., a metro rail service provider).

In an embodiment, at least two nodes of each of the distributed ledger 116 and/or the distributed ledger 118 may store the transaction records associated with a MaaS mobility service. The transaction records associated with the MaaS mobility service may be included in a set of state objects, such as an initial state object and an updated version of the initial state object. Each state object may include a smart contract, a contract code (or rules of a transaction upon which parties to the transaction agree), and state properties (that may be updated when the transaction records is updated based on transaction messages from publisher node).

In at least one embodiment, each of the distributed ledger 116 and the distributed ledger 118 may be a decentralized and distributed database system which may maintain an immutable record of data operations or transactions. A set of data operations may be grouped together as a block and may be further linked to a previous block of data operations to form a chain of blocks. All blocks of data operations may be stored in a decentralized manner, whereby at least two participants or nodes of the distributed ledger 116 and the distributed ledger 118 may store a subset of blocks associated with one or more transactions in which the at least two participants or nodes may participate. Further, each of the distributed ledger 116 and the distributed ledger 118 may include an operating system (for example, a Java Virtual Machine (JVM)) which may allow for deployment of a smart contract between multiple parties, for example, mobility providers and a MaaS provider of the first MaaS network 102.

By way of example, and not limitation, each of the distributed ledger 116 and the distributed ledger 118 may be a Corda blockchain, an Ethereum blockchain, or a Hyperledger blockchain. Each of the distributed ledger 116 and the distributed ledger 118 may store a set of immutable state objects that may be tracked by the respective distributed ledgers. The state object may include transaction data (from a transaction record), such as a smart contract between parties, contract code (rules of transaction), and content including state properties with certain state values. The smart contract may include a set of conditions under which multiple parties to the smart contract may agree to interact with each other. The smart contract may run on one or more nodes of the respective distributed ledgers and may govern transitions between state objects to generate a transaction. The smart contract may be written once, reused for a large numbers of state objects, and may refer to a governing legal prose by way of cryptographic hashes.

Each of the distributed ledger 116 and the distributed ledger 118 may use secure cryptographic hashes to identify parties and data, and also to link a state object to a previous version of the state object to further provide a chain of provenance. A transaction between a group of parties may be stored (as an associated transaction record) on the respective distributed ledgers such that only the group of parties associated with the transaction may be able to view the transaction. A party associated with a transaction may store a current state object of the transaction in a vault (i.e. a database associated with a respective distributed ledger). Another party eligible to view or process the transaction (e.g., validate the transaction) may retrieve the current state object of the transaction from the vault. Additionally, each state object of the respective distributed ledgers may include a smart contract between the parties or nodes that may participate in an associated transaction.

On each of the distributed ledger 116 and the distributed ledger 118, a participant or a node (for example, the first MP node 116A and/or the first MaaS node 118A) may update a transaction by updating state properties of an input state object to produce an output state object. The updated transaction may thereby create a chain of provenance which may be associated with the transaction data. Each of the distributed ledger 116 and the distributed ledger 118 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, a uniqueness of the updated transaction may be determined based on a check that there exists no other transaction that has reached a consensus by use of the same input state object as the current transaction.

In accordance with an embodiment, each of the distributed ledger 116 and the distributed ledger 118 may be associated with a decentralized application that may include a client-side interface (a front-end) and a server-side interface (a back end). The decentralized application may be configured to implement a workflow (e.g., a Corda flow) to record a transaction (and thereby store an associated transaction record) on a node of the respective distributed ledger (such as the MP node 116A and/or the MaaS node 118A). The client-side interface may be hosted on each of the first plurality of subscriber nodes 114A, 114B, . . . 114N and may be configured to load up on a client associated with a subscriber node. For example, the client-side interface of the decentralized application may be a Remote Procedure Call (RPC) client that may be configured on each subscriber node. The server-side interface of the decentralized application may run on each node of the distributed ledger 116 and the distributed ledger 118.

In an embodiment, each of the first MP node 116A and the first MaaS node 118A may be configured to receive a transaction message via the first subscriber node 114A. Each of the first MP node 116A and the first MaaS node 118A may update the initial state object associated with each of the distributed ledger 116 and the distributed ledger 118, respectively, based on the transaction message to output an updated state object. Each of the first MP node 116A and the first MaaS node 118A may build a transaction that may include the initial state object with initial transaction data and the updated state object with updated transaction data.

The aggregator database node 122 may include suitable logic, circuitry, code, and/or interfaces that may be configured to store a first set of transaction records of a first plurality of transaction records associated with all the mobility providers of the first MaaS network 102. The storage of the first set of transaction records in the aggregator database node 122 may be based on the first data retention threshold and the first storage duration of the first plurality of transaction records on the first MaaS node 118A. In an embodiment, the aggregator database node 122 may be configured to store selected transaction records from the first set of transaction records, based on an aggregation logic. In accordance with an embodiment, the aggregator database node 122 may be a node of a distributed ledger (e.g., the distributed ledger 118) related to the first MaaS network 102 that may store the first set of transaction records associated with the mobility providers of the first MaaS network 102. In accordance with another embodiment, the aggregator database node 122 may be a non-distributed ledger (or a local) node.

The archival database node 124 may include suitable logic, circuitry, code, and/or interfaces that may be configured to store a second set of transaction records associated with all the mobility providers of the first MaaS network 102. The storage of the second set of transaction records in the archival database node 124 may be based on the second data retention threshold and the second storage duration of a third set of transaction records stored on the aggregator database node 122. The third set of transaction records may include at least the first set of transaction records that may be stored on the aggregator database node 122. In accordance with an embodiment, the archival database node 124 may be a node of a distributed ledger (e.g., the distributed ledger 118) related to the first MaaS network 102 that may store the second set of transaction records associated with the mobility providers of the first MaaS network 102. In accordance with another embodiment, the archival database node 124 may be a non-distributed ledger (or a local) node without querying mechanism. A non-distributed ledger based node may be cost effective and faster than a distributed ledger based node.

The cache database node 126 may include suitable logic, circuitry, code, and/or interfaces that may be configured to store frequently queried transaction records in a fast temporary memory or database. The cache database node 126 may enable reduction in workload of other database nodes, such as the plurality of MP nodes 116A, 116B, . . . 116N, the plurality of MaaS nodes 118A, 118B, . . . 118N, the aggregator database node 122, and the archival database node 124.

The first server 128 may include suitable logic, circuitry, and interfaces, and/or code that may be configured to query one or more first transaction records stored on the aggregator database node 122 and verify one or more transactions associated with the queried one or more first transaction records. The first server 128 may be further configured to query one or more second transaction records stored on the archival database node 124 and control display of statistical information associated with the queried one or more second transaction records. In some embodiments, if the one or more second transaction records are cached by the cache database node 126, the first server 128 may be configured to query one or more third transaction records from the one or more second transaction records stored on the cache database node 126. The first server 128 may control the display of the statistical information associated with the queried one or more third transaction records, in a similar manner.

In accordance with an embodiment, the first server 128 may be configured to process API requests, such as, API requests associated with transaction verification, analytics, or visualization. The API request may be processed based on the one or more first transaction records stored on the aggregator database node 122 and/or the one or more second transaction records stored on the archival database node 124 (or the cache database node 126). In accordance with an embodiment, the first server 128 may provision API services that may be programmed based on a scripting language, such as, but not limited to, JavaScript or Python. The first server 128 may be implemented as a cloud server or a cluster of cloud servers that may execute operations through web applications, cloud applications, HTTP requests, repository operations, file transfer, and the like. Other example implementations of the first server 128 may include, but are not limited to, a database server, a file server, a web server, a media server, an application server, a mainframe server, or a cloud computing server.

In at least one embodiment, the first server 128 may be implemented as a plurality of distributed cloud-based resources by use of several technologies that are well known to those ordinarily skilled in the art. A person with ordinary skill in the art will understand that the scope of the disclosure may not be limited to the implementation of the first server 128 and the broker node device 112 as two separate entities. In certain embodiments, the functionalities of the first server 128 can be incorporated in its entirety or at least partially in the broker node device 112, without a departure from the scope of the disclosure.

In operation, the first MaaS node 118A of the first node package (such as the first subscriber node 114A, the first MP node 116A and the first MaaS node 118A) from the plurality of node packages 120 may be configured to select a first set of transaction records from a first plurality of transaction records stored on the first MaaS node 118A. Each of the first plurality of transaction records may be associated with a transaction message received by the first subscriber node 114A of the first node package. The first set of transaction records may be selected based on a first data retention threshold and a first storage duration of each of the first plurality of transaction records on the first MaaS node 118A. For example, if the first data retention threshold is three days, the first MaaS node 118A may select all transaction records of the first plurality of transaction records that have a storage duration (i.e., first storage duration) of three or more days, as the first set of transaction records. Furthermore, the first MaaS node 118A may transmit the selected first set of transaction records to the aggregator database node 122 for storage at the aggregator database node 122. The details of the selection of the first set of transaction records and the transmission of the selected first set of transaction records are provided, for example, in FIG. 4B.

The first MaaS node 118A may further control a selection of a second set of transaction records from a third set of transaction records stored on the aggregator database node 122. The first MaaS node 118A may control the selection of the second set of transaction records based on a second data retention threshold and a second storage duration of each of the first set of transaction records on the aggregator database node 122. The first MaaS node 118A may control the selection of the second set of transaction records by transmission of a command to the aggregator database node 122 to select the second set of transaction records based on the second data retention threshold and the second storage duration. For example, the second data retention threshold may be sixty days. In this case, the first MaaS node 118A may control the aggregator database node 122 to select all the transaction records from the third set of transaction records stored on the aggregator database node 122 that have a storage duration (i.e., the second storage duration) of sixty days or more, as the second set of transaction records. Herein, the third set of transaction records may at least include the first set of transaction records received from the first MaaS node 118A. The third set of transaction records may further include other transaction records, which may be older or newer than the first set of transaction records. The first MaaS node 118A may further control a transmission of the selected second set of transaction records to the archival database node 124 for storage at the archival database node 124. The details of the selection of the second set of transaction records and the transmission of the selected second set of transaction records are provided, for example, in FIG. 4C. In some embodiments, each node package of the plurality of node packages 120 may be connected to the client layer 104, through the broker layer 106, via a plug-in interface. The details of the plug-in interface are provided, for example, in FIG. 2.

In accordance with an embodiment, the first server 128 associated with each of the aggregator database node 122 and the archival database node 124 may be configured to transmit, to the aggregator database node 122, a query for one or more first transaction records stored on the aggregator database node 122. In an exemplary scenario, the one or more first transaction records may be frequently queried by the first server 128. The one or more first transaction records may be queried, for example, to resolve a dispute between an organization that manages the first MaaS network 102 and one or more mobility providers of the first MaaS network 102, or between two or more mobility providers of the first MaaS network 102.

The first server 128 may further receive the queried one or more first transaction records from the aggregator database node 122. The received or more first transaction records may be, for example, related to the transaction messages associated with a same mobility provider or different mobility providers. Moreover, the first server 128 may verify the one or more transactions associated with the queried one or more first transaction records. The verification of the one or more transactions may be performed by the first server 128, for example, to resolve the dispute. For example, the first server 128 may determine a total amount of transactions and amounts of revenue distributed amongst the organization (i.e. that manages the first MaaS network 102) and the one or more mobility providers that may have provided mobility services associated with the transactions. The first server 128 may verify a match between the total amount of transactions and the total amounts of distributed revenues. Further, the first server 128 may verify that the distribution of the revenue is according to a pre-defined revenue distribution agreement amongst the organization and the various mobility providers of the first MaaS network 102. In an embodiment, the revenue distribution may be based on protocols associated with distributed ledger technologies such as a smart contract. Thus, the first server 128 may verify that the distribution of the revenue is in accordance with the smart contract amongst the organization and the various mobility providers of the first MaaS network 102.

In accordance with an embodiment, the first server 128 may be further configured to transmit a query for one or more second transaction records stored on the archival database node 124 to the archival database node 124. The first server 128 may further receive the queried one or more second transaction records from the archival database node 124. The one or more second transaction records stored on the archival database node 124 may be queried, for example, to enable dispute resolution, audit, and compliance tasks associated with the first MaaS network 102.

The first server 128 may further display statistical information associated with the queried one or more second transaction records. The statistical information associated with the queried one or more second transaction records may include, but is not limited to, a transaction identification (ID) of each of the queried one or more second transaction records, a timestamp associated with each of the queried one or more second transaction records, or a routing path of each of the queried one or more second transaction records. The statistical information may further include, but is not limited to, a distribution of transaction records across each mobility provider, a distribution of transaction value across each mobility provider, a distribution of transaction records across days, weeks, months, or years; or a distribution of transaction records across users of the first MaaS network 102.

In accordance with an embodiment, the cache database node 126 may be configured to receive the queried one or more second transaction records from the archival database node 124. The cache database node 126 may store the received one or more second transaction records on the cache database node 126. The cache database node 126 may further receive a query for one or more third transaction records from the first server 128. The one or more third transaction records may be included in the one or more second transaction records stored on the cache database node 126. The cache database node 126 may transmit the one or more third transaction records, to the first server 128, based on the received query for the one or more third transaction records. In some embodiments, the one or more third transaction records may be frequently queried transaction records of the archival database node 124. Thus, the one or more third transaction records may be easily accessed by the first server 128, for use, such as for dispute resolution, audit, and compliance tasks associated with the first MaaS network 102.

In an embodiment, to scale-up the first MaaS network 102, one or more new node packages may be added to the plurality of node packages 120. Each of the one or more new node packages may include a subscriber node and a pre-configured set of nodes for a mobility provider (e.g., a local MP node) and a MaaS provider (e.g., a local MaaS node). To enhance the transaction performance and throughput, the subscriber node and the pre-configured set of nodes of the one or more new node packages may be deployed as one of, but not limited to, edge nodes, edge devices, or fog or cloud computing capable devices. The MaaS provider node (e.g., the local MaaS node) may be connected with the aggregator database node 122 (e.g., a central node) for data consolidation. Further, the subscriber node of the new node package may be connected to the broker layer 106 (including the broker node device 112) through the plug-in interface 200, described further, for example, in FIG. 2. In an embodiment, the aggregator database node 122 may be a node of the distributed ledger 118 associated with the MaaS provider. Once the MaaS provider node (e.g., the local MaaS node) may be connected with the aggregator database node 122, the MaaS provider node (e.g., the local MaaS node) may select a first set of transaction records from a plurality of transaction records stored on the MaaS provider node (e.g., the local MaaS node) and transmit the selected first set transaction records to the aggregator database node 122 for storage. The selection of the first set of transaction records may be based on a storage duration of each of the plurality transaction record on the MaaS provider node (e.g., the local MaaS node) and a data retention threshold associated with the MaaS provider node (e.g., the local MaaS node). Further, the aggregator database node 122 may be configured to select a second set of transaction records from a third set of transaction records stored on the aggregator database node 122 and transmit the selected second set of transaction records to the archival database node 124 for storage. The selection and transmission of the second set of transaction records may be based on a receipt of an instruction from the MaaS provider node (e.g., the local MaaS node) by the aggregator database node 122. The selection of the second set of transaction records may be based on the second storage duration of the third set of transaction records on the aggregator database node 122 and the second data retention threshold of the aggregator database node 122. In an embodiment, the third set of transaction records may include at least the first set of transaction records. The archival of transaction records is explained further, for example, in FIGS. 3, and 4A-4C.

In an embodiment, each node package of the plurality of node packages 120 may be implemented as one of a set of edge nodes, a set of edge devices, or a set of fog or cloud computing capable devices. The nodes of each node package (e.g., a subscriber node, an MP node, and a MaaS node) may be deployed in a physical proximity to the plurality of publisher nodes 110A-110N (i.e., the client layer 104) of the first MaaS network 102. The physical proximity may reduce a transaction latency and may limit capacity of the client layer 104 based on a performance limit of the plurality of node package 120, which may further lead to a reduction of transaction failures. Further, transaction handling capacity of the first MaaS network 102 may be scaled-up by addition of new node packages to the first MaaS network 102. Each of such node package may be easily set-up based on a configuration template, wherein a pre-configured set of MP node and MaaS node may be coupled to a subscriber node. The subscriber node of the new node package may be connected to the broker node device 112 of first MaaS network 102 through the plug-in interface. Further, the MaaS node of the new node package may be connected to the aggregator database node 122. The MaaS node may thereafter start archival of the transaction records to the aggregator database node 122 and then to the archival database node 124, as described in the aforementioned. Moreover, the aggregator database node 122 may utilize the transaction records merged from the plurality of MaaS nodes 118A, 118B, . . . 118N, for the revenue distribution amongst the MaaS provider and the one or more mobility providers, and data analytics as described, for example, in FIG. 5.

Figure 2:
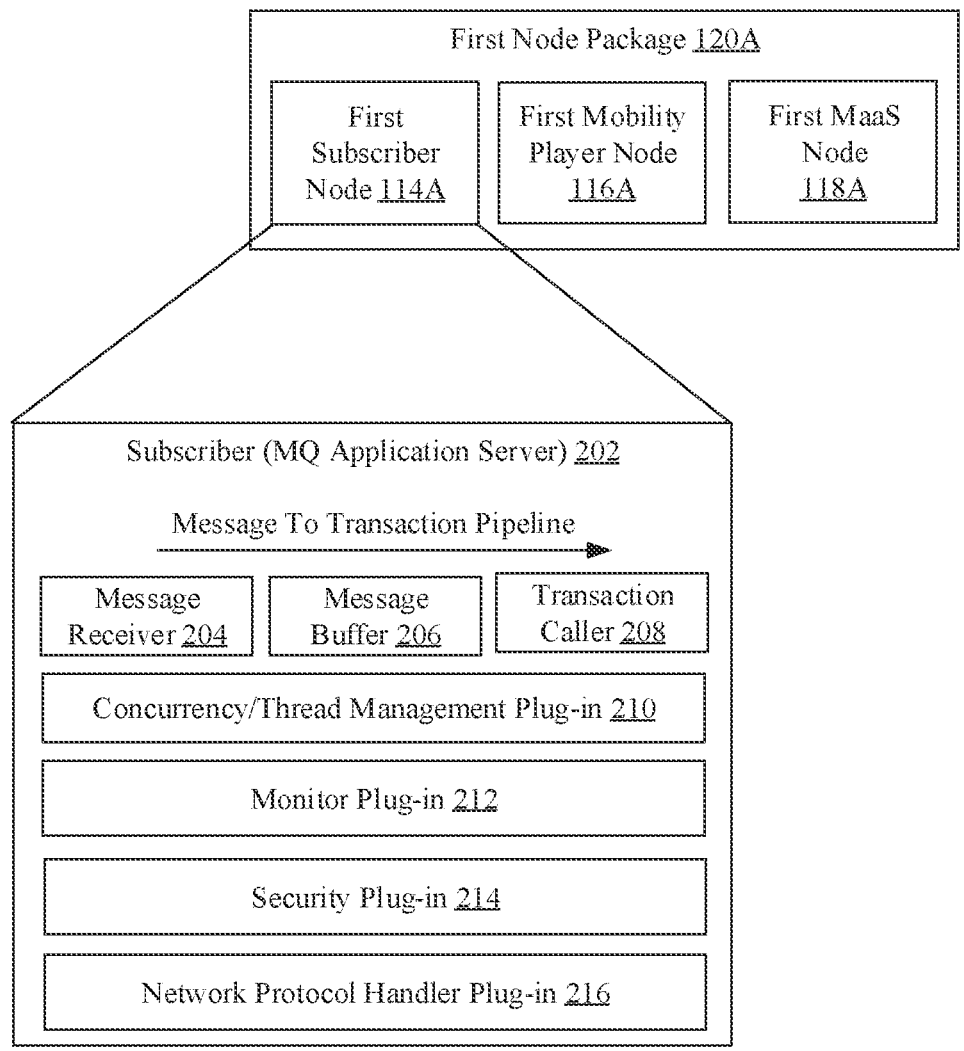
FIG. 2 is an exemplary block diagram of a plug-in interface of a node package of a MaaS network, in accordance with an embodiment of the disclosure.

FIG. 2 is an exemplary block diagram of a plug-in interface of a node package of a MaaS network, in accordance with an embodiment of the disclosure. FIG. 2 is explained in conjunction with elements from FIG. 1. With reference to FIG. 2, there is shown a block diagram 200. The block diagram 200 may include a first node package 120A of the plurality of node packages 120. The first node package 120A may include the first subscriber node 114A, the first MP node 116A, and the first MaaS node 118A.

A plug-in interface associated with the first subscriber node 114A may include a message queue (MQ) application server 202. The MQ application server 202 may include a message receiver 204, a message buffer 206, a transaction caller 208, a concurrency/thread management plug-in 210, a monitor plug-in 212, a security plug-in 214, and a network protocol handler plug-in 216. In an embodiment, the message receiver 204, the message buffer 206, the concurrency/thread management plug-in 210, the monitor plug-in 212, the security plug-in 214, and the network protocol handler plug-in 216 may be pre-built plug-ins with base functionalities. The transaction caller 208 may be a user-configurable plug-in that may be utilized to process transaction messages.

The MQ application server 202 may be configured to enable inter-process communication, between the client layer 104 (via, the broker layer 106) and the first subscriber nodes 114A of the server layer 108. The MQ application server 202 may utilize a queue (such as, a message queue) for transmission and reception of the transaction messages. The message queue may be implemented as an asynchronous queue (based on an asynchronous messaging protocol, such as, MQTT or AMQP) to receive incoming transaction messages from one or more publisher nodes of the client layer 104 and forward the received incoming transaction messages to a subscriber node (e.g., the first subscriber node 114A) at which the message queue may be implemented. Thus, the transaction messages may be asynchronously delivered to the first subscriber node 114A without a real-time communication between a sender publisher node and a recipient subscriber node (such as the first subscriber node 114A). The message queue may store the received incoming transaction messages for the first subscriber node 114A until the first subscriber node 114A may be available to receive and process such incoming transaction messages.

The MQ application server 202 may include a message-to-transaction pipeline (as shown in FIG. 2) that may process the received incoming transaction messages and convert the received incoming transaction messages to transaction records for storage on the first MP node 116A and the first MaaS node 118A. The message-to-transaction pipeline may start on the receipt of a transaction message by the MQ application server 202. The message-to-transaction pipeline may perform a different operations, for example, a validation check (e.g., by use of the monitor plug-in 212), a security check (e.g., by use of the security plug-in 214), a request for parameter creation (by use of the monitor plug-in 212 and/or the network protocol handler plug-in 216), logging (by use of the monitor plug-in 212), transaction call (by use of the transaction caller 208), transaction result handling (by use of the monitor plug-in 212), and an action after the creation of the transaction (e.g., transmission of the created transaction record to the first MP node 116A and the first MaaS node 118A). In an embodiment, the message-to-transaction pipeline may use the concurrency/thread management plug-in 210 to run concurrently and manage simultaneous incoming transaction messages. Further, the transaction messages may be buffered in the message-to-transaction pipeline via the message buffer 206.

In an embodiment, to convert the incoming transaction message to a transaction, the MQ application server 202 may validate a header and a format of the transaction message. The MQ application server 202 may be configured to create a transaction message parameter by addition of meta information (such as, but not limited to, a subscriber node identifier and a timestamp). Once the transaction message parameter may be created, the MQ application server 202 may execute the transaction call.

The message receiver 204 may be configured to receive the incoming transaction messages from one or more publisher nodes of the plurality of publisher nodes 110, (such as, the first publisher node 110A). In an embodiment, the message receiver 204 may implement an asynchronous message queue of the MQ application server 202.

The message buffer 206 may be configured to store the received incoming transaction messages in a buffer (or temporary) memory of the first subscriber node 114A before each of the received incoming transaction messages may be processed by the first subscriber node 114A. The received incoming transaction messages may be stored in the buffer memory 206 to match a rate of a reception of the incoming transaction messages with a rate at which transaction messages may be processed by the first subscriber node 114A In some embodiments, the rate at which the transaction messages may be processed by the first subscriber node 114A may be dependent on a size of the subsequent MP node (such as the first MP node 116A).

The transaction caller 208 may be a customizable application (for example, a middleware application, such as, a Java servlet application) that may be curated by the administrator 132 or a developer associated with the first MaaS network 102. The transaction caller 208 may be utilized to extend the capabilities of the MQ application server 202. For example, the transaction caller 208 may be programmed to handle the received incoming transaction messages and execute transaction calls on a remote procedure call (such as a smart contract) on the first distributed ledger and the second distributed ledger for subsequent creation of associated transaction records in the first MP node 116A and the first MaaS node 118A.

The concurrency/thread management plug-in 210 may be configured to run multiple threads (for example, a part of a process) of tasks associated with the first subscriber node 114A simultaneously. The concurrency/thread management plug-in 210 may improve performance of the first subscriber node 114A by execution of multiple tasks in parallel. Examples of such tasks may include, but are not limited to, the reception of the transaction messages at the message receiver 204, the storage of the received transaction messages in the message buffer 206, and the execution of the transaction calls associated with the received transaction messages by the transaction caller 208 to process the received transaction messages.

The monitor plug-in 212 may be configured to monitor the message-to-transaction pipeline associated with a conversion of the incoming transaction messages to transaction records by the MQ application server 202. Moreover, the monitor plug-in 212 may be configured to handle errors that may arise while the conversion of the incoming transaction messages. For example, the monitor plug-in 212 may verify the header and the format associated with a received transaction message and determine whether the received transaction message is valid based on the verification of the header and the format. Moreover, the monitor plug-in 212 may record the transaction identification, such as the co-relation ID associated with the transaction messages, such that the transaction messages may be traced. Thus, the monitor plug-in 212 may handle transaction errors. In case an error is detected based on the verification, the monitor plug-in 212 may transmit an alert to the first subscriber node 114A. The monitor plug-in 212 may thereby act as a monitor and alert plug-in, and/or as a transaction error handling plug-in.

The monitor plug-in 212 may be further configured to monitor resources and throughput associated with the MQ application server 202. For example, the monitor plug-in 212 may monitor a processor utilization associated with the concurrency/thread management plug-in 210. Further, the monitor plug-in 212 may monitor a memory utilization of the message buffer 206. In addition, the monitor plug-in 212 may monitor a network utilization or available network bandwidth associated with the message receiver 204. The monitor plug-in 212 may also thereby act as a transaction management plug-in.

The security plug-in 214 may be configured to enable the MQ application server 202 to securely receive transaction messages. In an embodiment, the security plug-in 214 may enable identification of the incoming transaction messages based on content in the header of each incoming transaction message. For example, the header may include an identification of a creator/sender of the incoming transaction message (such as, an identification of a publisher node). The security plug-in 214 may allow a reception of an incoming transaction message by the MQ application server 202 when a creator or a sender of the transaction message is recognized as a whitelisted or authorized publisher node. The security plug-in 214 may thereby manage a permission associated with the receipt of transaction messages and filter transaction messages based on the identification of the creator or sender of the transaction message.

The network protocol handler plug-in 216 may be configured to enable the first subscriber node 114A communicate with other nodes (e.g., the broker node device 112 and one or more publisher nodes) of the first MaaS network 102 based on a pre-defined network protocol. The network protocol may include a set of rules that may govern the communication of transaction messages between a plurality of nodes of the first MaaS network 102, such as, the plurality of publisher nodes 110, the broker node device 112 and the first plurality of subscriber nodes 114A, 114B, . . . 114N of the first MaaS network 102. Examples of the network protocol may include, but are not limited to, Hypertext Transfer Protocol (HTTP), MQTT, or AMQP. The network protocol handler plug-in 216 may be further configured to perform data scheme and data quality checks on the received transaction messages. For example, the network protocol handler plug-in 216 may verify that a uniform pre-defined data request or response format (e.g., JSON, CSV, or XML format) and a common API/data scheme may be adhered by the first subscriber node 114A in its communication with the other nodes of the first Maas network 102. The network protocol handler plug-in 216 may thereby act as a network protocol plug-in and as a data scheme and data quality check plugin.

Figure 3:
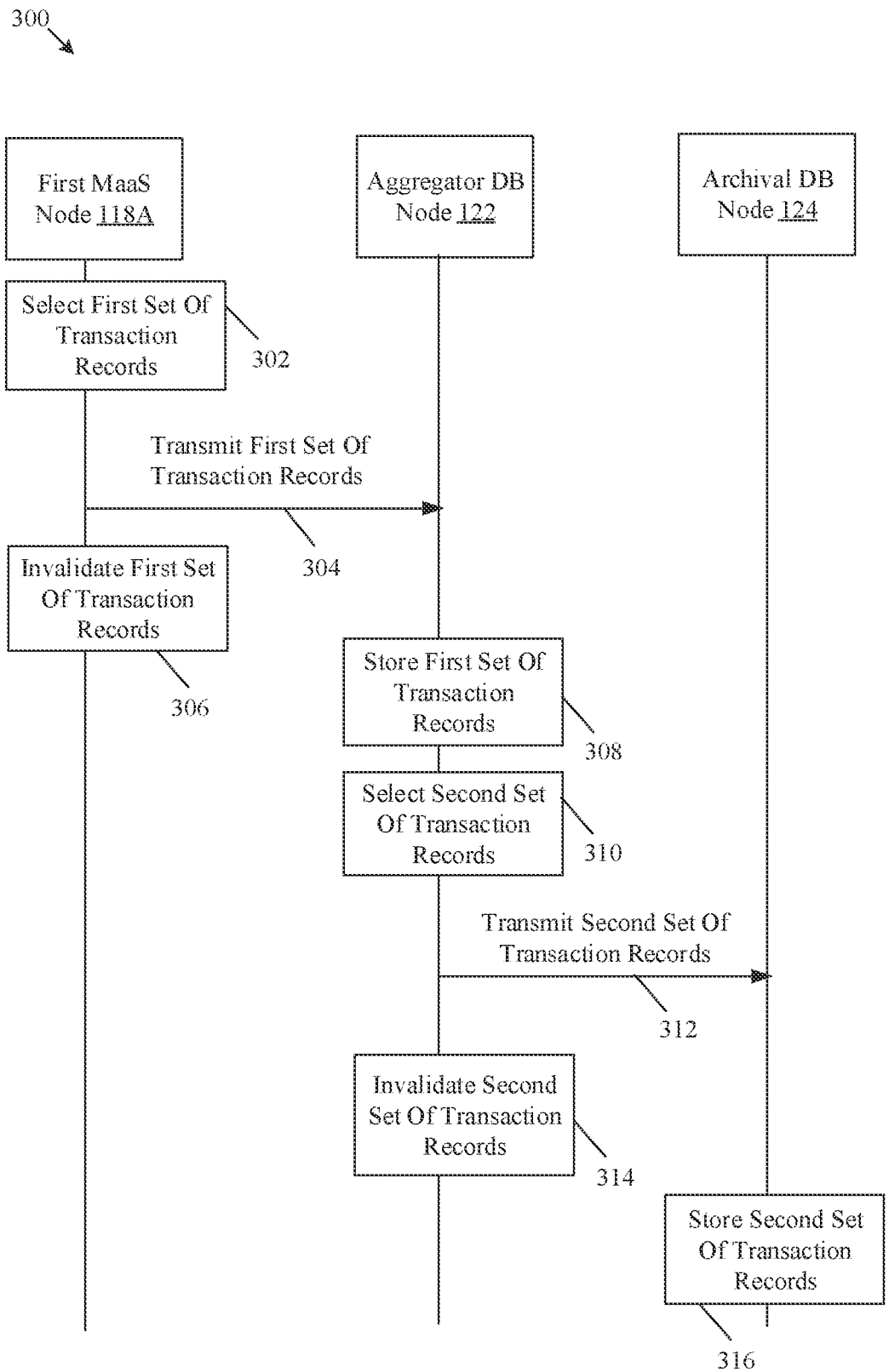
FIG. 3 is an exemplary sequence diagram that depicts support of largescale transactions and node archival on a MaaS platform based on common database architecture, in accordance with an embodiment of the disclosure.

FIG. 3 is an exemplary sequence diagram that depicts support of largescale transactions and node archival on a MaaS platform based on common database architecture, in accordance with an embodiment of the disclosure. FIG. 3 is explained in conjunction with elements from FIGS. 1 and 2. With reference to FIG. 3, there is shown a sequence diagram 300 that illustrates a sequence of operations from 302 to 316. The sequence of operations may be executed by various nodes of the first MaaS network 102 (such as, the first MaaS node 118A, the aggregator database node 122, and the archival database node 124) of FIG. 1.

At 302, a first set of transaction records may be selected from a first plurality of transaction records stored on a first MaaS node (for example the first MaaS node 118A). In accordance with an embodiment, the first MaaS node 118A may be configured to select the first set of transaction records from the first plurality of transaction records. The first set of transaction records may be selected based on a first data retention threshold and a first storage duration of each of the first plurality of transaction records on the first MaaS node 118A.

In accordance with an embodiment, the first MaaS node 118A may be configured to compare the first storage duration of each of the first plurality of transaction records on the first MaaS node 118A with the first data retention threshold. The first MaaS node 118A may further select the first set of transaction records from the first plurality of transaction records based on the comparison. For example, the first data retention threshold for the first MaaS node 118A to store the first plurality of transaction records may be three days. The first MaaS node 118A may compare the first storage duration of each of the first plurality of transaction records with the first data retention threshold i.e., three days. The first storage duration may indicate from how many hours, days, weeks, or months a particular transaction record is stored in the first MaaS node 118A. Based on the comparison, the first MaaS node 118A may select those transaction records from the first plurality of transaction records, as the first set of transaction records, whose first storage duration is more than three days on the first MaaS node 118A. An example of the first plurality of transaction records that may be stored on the first MaaS node 118A is explained, for example, in FIG. 4A. An example of the selection of the first set of transaction records from the first plurality of transaction records stored on the first MaaS node 118A is explained, for example, in FIG. 4B.

At 304, the selected first set of transaction records may be transmitted to the aggregator database node 122. In accordance with an embodiment, the first MaaS node 118A may be configured to transmit the selected first set of transaction records to the aggregator database node 122. The selected first set of transaction records may be transmitted to the aggregator database node 122 once (or after) the first storage duration of the selected first set of transaction records exceeds the first data retention threshold on the first MaaS node 118A.

At 306, the selected first set of transaction records may be invalidated in the first MaaS node 118A based on the transmission of the selected first set of transaction records to the aggregator database node 122. In accordance with an embodiment, the first MaaS node 118A may be configured to invalidate (or deactivate i.e. soft-delete) the selected first set of transaction records from the first MaaS node 118A based on the transmission of the selected first set of transaction records to the aggregator database node 122. In certain scenarios, the first MaaS node 118A may receive an acknowledgement of receipt of the first set of transaction records at the aggregator database node 122 from the aggregator database node 122. In some embodiments, the first MaaS node 118A may invalidate the selected first set of transaction records from the first MaaS node 118A based on the receipt of such acknowledgement from the aggregator database node 122. The invalidation of the selected first set of transaction records may enhance the performance of the first MaaS network 102 as the amount of valid data on the first MaaS node 118A may be reduced. In another embodiment, the first MaaS node 118A may be configured to delete the selected first set of transaction records from the first MaaS node 118A, when the first MaaS network 102 may be implemented as an offline (a non-distributed ledger) database system. For example, the invalidation (or deactivation) of older transaction records (e.g., the first set of transaction records, whose first storage duration exceeds the first data retention threshold) from the first MaaS node 118A may free up storage space on the first MaaS node 118A for newer transaction records. This may enable the first MaaS node 118A to be implemented as a storage with a smaller but faster memory, which may enhance the performance of the first MaaS node 118A and improve transaction throughput of the first MaaS network 102.

Moreover, the invalidation of the selected first set of transaction records may allow reduction of a number of nodes of the plurality of MaaS nodes 118A, 118B, ... 118N. The reduction of the number of nodes or the refreshing of the nodes may be based on a retention policy for the transaction messages. The retention policy may be set as configurable and may be based on the transaction messages pushed into the aggregator database node 122. Further, the retention policy may be based on a compliance of storage of the data (such as the transaction messages) at different nodes of the plurality of MaaS nodes 118A, 118B, ... 118N for a specific time period. For example, the retention policy may state that the storage of the transaction messages may be for the time period of 6 months, based on General data protection regulation (GDPR) compliance policy. In addition, the retention policy may be in accordance with a configurable time period, business logic or requirements from the MaaS platform. The retention policy may be maintained to manage the performance of the MAAS platform on regular basis (for example, on a daily basis) by reduction or refreshing of the number of nodes of the plurality of MaaS nodes 118A, 118B, ... 118N. In some embodiments, compliance policies, such as the GDPR compliance policy may further be utilized for anonymization of the data, such as the personal information corresponding to the users.

At 308, the first set of transaction records may be stored on the aggregator database node 122. In accordance with an embodiment, the first MaaS node 118A may be configured to control the aggregator database node 122 to store the first set of transaction records on the aggregator database node 122. For example, the first MaaS node 118A may transmit an instruction to the aggregator database node 122 to store the first set of transaction records on the aggregator database node 122. The storage of the first set of transaction records on the aggregator database node 122 may enable the first server 128 to query the aggregator database node 122 for one or more first transaction records from the first set of transaction records.

At 310, a second set of transaction records may be selected from a third set of transaction records stored on the aggregator database node 122. In accordance with an embodiment, the first MaaS node 118A may be configured to control the selection of the second set of transaction records from the third set of transaction records stored on the aggregator database node 122. For example, the first MaaS node 118A may transmit an instruction (as control) to the aggregator database node 122 to select the second set of transaction records from the third set of transaction records. The second set of transaction records may be selected based on a second data retention threshold and a second storage duration of each of the third set of transaction records on the aggregator database node 122. In an embodiment, the third set of transaction records may include the first set of transaction records received by the aggregator database node 122 from the first MaaS node 118A and stored on the aggregator database node 122. For example, the third set of transaction records may include the first of transaction records and other transaction records that may be stored on the aggregator database node 122 (i.e. older transaction records)

In accordance with an embodiment, the first MaaS node 118A may be configured to control a comparison of the second storage duration of each of the third set of transaction records on the aggregator database node 122 with the second data retention threshold. The first MaaS node 118A may further be configured to control a selection of the second set of transaction records from the third set of transaction records based on the comparison. For example, the first MaaS node 118A may transmit an instruction to the aggregator database node 122 to compare the second storage duration of each of the third set of transaction records with the second data retention threshold and select the second set of transaction records based on a result of the comparison. In accordance with an embodiment, the second data retention threshold may be greater than the first data retention threshold. In an alternate embodiment, the second data retention threshold may be lower than the first data retention threshold. For example, the second data retention threshold may be sixty days (i.e., more than the first data retention threshold of say, three days). The first MaaS node 118A may control the comparison of the second storage duration of each of the third set of transaction records with the second data retention threshold i.e., sixty days. Based on the comparison, the first MaaS node 118A may control the selection of those transaction records (as the second set of transaction records) from the third set of transaction records whose second storage duration is more than sixty days on the aggregator database node 122. An example of the selection of the second set of transaction records from the third set of transaction records stored on the aggregator database node 122 is explained, for example, in FIG. 4C.

At 312, the selected second set of transaction records may be transmitted to the archival database node 124. In accordance with an embodiment, the first MaaS node 118A may be configured to control the transmission the selected second set of transaction records from the aggregator database node 122 to the archival database node 124. For example, the first MaaS node 118A may transmit an instruction to the aggregator database node 122 to transmit the selected second set of transaction records to the archival database node 124. The aggregator database node 122 may transmit the selected second set of transaction records to the archival database node 124 once (or after) the second storage duration of the selected second set of transaction records exceeds the second data retention threshold on the aggregator database node 122.

At 314, the selected second set of transaction records may be invalidated (or deactivated) in the aggregator database node 122 based on the transmission of the selected second set of transaction records to the archival database node 124. In accordance with an embodiment, the first MaaS node 118A may be configured to control the invalidation (or deactivation) of the selected second set of transaction records in the aggregator database node 122 based on the transmission of the selected second set of transaction records to the archival database node 124. For example, the first MaaS node 118A may transmit an instruction to the aggregator database node 122 to invalidate the selected second set of transaction records from the aggregator database node 122 based on the transmission of the selected second set of transaction records to the archival database node 124 by the aggregator database node 122. In another embodiment, the first MaaS node 118A may be configured to control to delete the selected second set of transaction records in the aggregator database node 122, when the aggregator database node 122 is implemented as the offline (the non-distributed ledger) database system. In such a case, the deletion or the invalidation (or deactivation) of older transaction records (e.g., the second set of transaction records, whose second storage duration exceeds the second data retention threshold) from the aggregator database node 122 may free up storage space on the aggregator database node 122 for newer transaction records. This may enable the aggregator database node 122 to be implemented as a storage with a smaller but faster memory, which may enhance the performance of the aggregator database node 122 and improve a query response time associated with queries for transaction records, that may be received from the first server 128.

At 316, the second set of transaction records may be stored on the archival database node 124. In accordance with an embodiment, the first MaaS node 118A may be configured to control the archival database node 124 to store the second set of transaction records on the archival database node 124. For example, the first MaaS node 118A may transmit an instruction to the archival database node 124 to store the second set of transaction records on the archival database node 124. The storage of the second set of transaction records on the archival database node 124 may enable the first server 128 to query the archival database node 124 for one or more second transaction records from the second set of transaction records.

In an embodiment, the first MaaS node 118A may be configured control the archival database node 124 to store the second set of transaction records on the archival database node 124 based on a tamperproof data storage technique. For example, the first MaaS node 118A may transmit an instruction to the archival database node 124 to store the second set of transaction records based on the tamperproof data storage technique. In an example, the tamperproof data storage technique may be a data hashing technique (e.g., for textual data) by use of which, a hash value of each transaction record may be calculated. The hash value may be used to determine a falsification of the transaction record during a retrieval of the transaction record. In an embodiment, in case of the offline database systems, the hash value of each transaction record may be stored in the first MaaS node 118A and may be retrieved to determine the falsification of the transaction record.

FIGS. 4A, 4B, and 4C, collectively, depict exemplary scenarios for support of largescale transactions and node archival on a MaaS platform based on common database architecture, in accordance with an embodiment of the disclosure. FIGS. 4A, 4B, and 4C are explained in conjunction with elements from FIGS. 1, 2 and 3. The exemplary scenarios of the FIGS. 4A, 4B, and 4C may include the first MaaS node 118A, the aggregator database node 122, and the archival database node 124. Each of the exemplary scenarios of FIGS. 4A, 4B, and 4C depicts a snapshot of transactions records stored on the first MaaS node 118A, the aggregator database node 122, and the archival database node 124 at a certain time. With reference to FIG. 4A, there is shown a first exemplary scenario 400A. The first exemplary scenario 400A depicts a storage of the first plurality of transaction records on the first MaaS node 118A and a storage of one or more transaction records on the aggregator database node 122. The first plurality of transaction records stored on the first MaaS node 118A, may include transaction records such as, "TR01", "TR02", "TR03", . . . . "TR11" (as shown in FIG. 4A for example). Further, the one or more transaction records stored on the aggregator database node 122 may include transaction records such as, "TR12" and "TR13" (as shown in FIG. 4A for example).

In an embodiment, the first MaaS node 118A may receive the first plurality of transaction records "TR01", "TR02", "TR03", . . . "TR11" from the first MP node 116A based on associated transaction messages received by the first subscriber node 114A. FIG. 4A further depicts the first storage duration of each of the first plurality of transaction records "TR01", "TR02", "TR03", . . . "TR11" on the first MaaS node 118A. For example, the transaction record "TR01" may be stored on the first MaaS node 118A for a storage duration (i.e., the first storage duration) of 10 hours. The transaction record "TR02" may be stored on the first MaaS node 118A for a storage duration (i.e., the first storage duration) of 15 hours. Similarly, the transaction record "TR09" may be stored on the first MaaS node 118A for a storage duration (i.e., the first storage duration) of 3 days and 2 hours. The transaction record "TR10" may be stored on the first MaaS node 118A for a storage duration (i.e., the first storage duration) of 3 days and 10 hours. Moreover, the transaction record "TR11" may be stored on the first MaaS node 118A for a storage duration (i.e., the first storage duration) of 3 days and 18 hours. In addition, the first exemplary scenario 400A shows that storage durations of the one or more transaction records stored on the aggregator database node 122. For example, the transaction record "TR12" may be stored for a storage duration of 4 hours and the transaction record "TR13" may be stored for a storage duration of 7 hours on the aggregator database node 122.

With reference to FIG. 4B, there is shown a second exemplary scenario 400B. The second exemplary scenario 400B depicts a transmission of the first set of transaction records to the aggregator database node 122 by the first MaaS node 118A and a storage of the first set of transaction records on the aggregator database node 122. In the second exemplary scenario 400B, the first data retention threshold may be, for example, three days. The first MaaS node 118A may be configured to select transaction records (from the first plurality of transaction records) with storage duration (i.e., the first storage duration) greater than the first data retention threshold (e.g., three days, in current case), as the first set of transaction records. The first MaaS node 118A may transmit the first set of transaction records to the aggregator database node 122, for example, at a specific time of each day.

In an exemplary embodiment, the first set of transaction records may include the transaction records "TR09", "TR10" and "TR11". The transaction record "TR09" may be stored at the first MaaS node 118A for the first storage duration of "3 days and 2 hours". The transaction record "TR10" may be stored at the first MaaS node 118A for the first storage duration of "3 days and 10 hours". The transaction record "TR11" may be stored at the first MaaS node 118A for the first storage duration of "3 days and 18 hours" as shown in FIG. 4B. Thus, as the first storage duration of each of the first set of transaction records exceeds the first data retention threshold, i.e., three days, the first MaaS node 118A may select the first set of transaction records (i.e. "TR09", "TR10" and "TR11") and transmit the selected first set of transaction records to the aggregator database node 122 for storage at the aggregator database node 122.

In accordance with an embodiment, the first MaaS node 118A may be further configured to invalidate the selected first set of transaction records, i.e., the transaction records "TR09", "TR10" and "TR11" from the first MaaS node 118A after the transmission of the selected first set of transaction records to the aggregator database node 122. The aggregator database node 122 may receive the first set of transaction records from the first MaaS node 118A and store (under control of the first MaaS node 118A based on an instruction received from the first MaaS node 118A) the first set of transaction records on the aggregator database node 122. On the storage of the first set of transaction records on the aggregator database node 122, a storage duration of the first set of transaction records on the aggregator database node 122 may be reset to "0" hours as shown in FIG. 4B. Thus, based on the transmission and invalidation of selected first set of transaction records, the aggregator database node 122 may store the transaction records "TR09", "TR10", "TR11" "TR12", and "TR13" and the first MaaS node 118A may now store the transaction records "TR01", "TR02", "TR03", "TR04", "TR05", "TR06", "TR07", and "TR08", as remaining transaction records on the first MaaS node 118A. Further, the transaction records "TR09", "TR10", "TR11" "TR12", and "TR13" on the aggregator database node 122 may correspond to the third set of transaction records that may include the received first set of transaction records (i.e. "TR09", "TR10" and "TR11") and the older transaction records (i.e. "TR12", and "TR13") stored on the aggregator database node 122, as shown in FIG. 4B.

With reference to FIG. 4C, there is shown a third exemplary scenario 400C. The third exemplary scenario 400C depicts a transmission of the second set of transaction records to the archival database node 124 by the aggregator database node 122 and a storage of the second set of transaction records on the archival database node 124. In the third exemplary scenario 400C, the second data retention threshold may be, for example, sixty days. The first MaaS node 118A may be configured to control the aggregator database node 122 to select transaction records (as the second set of transaction records) from the third set of transaction records with storage duration (i.e., the second storage duration) greater than the second data retention threshold (e.g., sixty days, in current case). For example, the first MaaS node 118A may transmit an instruction to the aggregator database node 122 to select the second set of transaction records and transmit the selected second set of transaction records to the archival database node 124.

The aggregator database node 122 may transmit the second set of transaction records to the archival database node 124, for example, at a specific time of each day or a week. Thus, at that specific time, the second set of transaction records may be transmitted to the archival database node 124. In an exemplary embodiment, the third set of transaction records may include the transaction records "TR01", "TR02", "TR03", "TR04", "TR05", "TR06", "TR07", "TR08", "TR09", "TR10", "TR11", "TR12", and "TR13". Thus, the third set of transaction records may include the first set of transaction records (i.e., the transaction records "TR09", "TR10", and "TR11"). Further, the third set of transaction records may include older transaction records (e.g., "TR12", and "TR13") and newer transaction records (e.g., "TR01", "TR02", "TR03", "TR04", "TR05", "TR06", and "TR07", "TR08") as compared to the first set of transaction records. The second set of transaction records that may be selected from the third set of transaction records may include, for example, the transaction records "TR09", "TR10", "TR11", "TR12", and "TR13". As shown in FIG. 4C, the transaction records "TR09", "TR10", "TR11", "TR12", and "TR13" may be stored at the aggregator database node 122 for the second storage duration of "60 days and 2 hours", "60 days and 2 hours", "60 days and 2 hours", "60 days 6 hours" and "60 days 9 hours", respectively. Thus, as the second storage duration of the second set of transaction records exceeds the second data retention threshold (i.e., sixty days, in current case), the second set of transaction records may be selected as the second set of transaction records and transmitted to the archival database node 124 for storage at the archival database node 124.

In accordance with an embodiment, the first MaaS node 118A may be further configured to control an invalidation of the selected second set of transaction records, i.e., the transaction records "TR09", "TR10", "TR11", "TR12", and "TR13" from the aggregator database node 122 after the transmission of the selected second set of transaction records to the archival database node 124. In an example, the first MaaS node 118A may transmit an instruction to the aggregator database node 122 for the invalidation of the selected second set of transaction records in the aggregator database node 122. The archival database node 124 may receive the second set of transaction records from the aggregator database node 122 and further store (i.e. under control of the first MaaS node 118A based on an instruction received from the first MaaS node 118A) the second set of transaction records on the archival database node 124. On the storage of the second set of transaction records on the archival database node 124, a storage duration of the second set of transaction records on the archival database node 124 may be reset to 0 hours. Thus, based on the transmission and invalidation of selected second set of transaction records, the archival database node 124 may store the transaction records "TR09", "TR10", "TR11" "TR12", and "TR13" and the aggregator MaaS node 122 may store the transaction records "TR01", "TR02", "TR03", "TR04", "TR05", "TR06", "TR07", and "TR08" as remaining transaction records on the aggregator MaaS node 122 as shown in FIG. 4C.

It may be noted that the first data retention threshold and the second data retention threshold shown in days (such as three days and sixty days respectively) in FIGS. 4A-4C is merely an example. The first data retention threshold applicable to the first MaaS node 118A and the second data retention threshold applicable to the aggregator database node 122 may be in certain seconds, minutes, hours, weeks, months, or years, without any deviation from the scope of the disclosure. In an embodiment, the first MaaS network 102 or the broker node device 112 may set or change the first data retention threshold and the second data retention threshold based on a determination of flow of transaction messages at the first MaaS network 102 or the broker node device 112. In some embodiments, the first subscriber node 114A or other subscriber node of the first MaaS network 102 may set or change the first data retention threshold and the second data retention threshold based on the receipt of transaction messages at the corresponding subscriber node (such as the first subscriber node 114A).

It may be further noted that the first MaaS node 118A from where the transaction records are selected and transmitted to the aggregator database node 122 and the archival database node 124 in FIGS. 4A-4C, is presented merely as an example. In some embodiments, the transaction records may be selected and transmitted from a MP node (such as the first MP node 116A) to the aggregator database node 122 and the archival database node 124, without any deviation from the scope of the disclosure.

Figure 5:
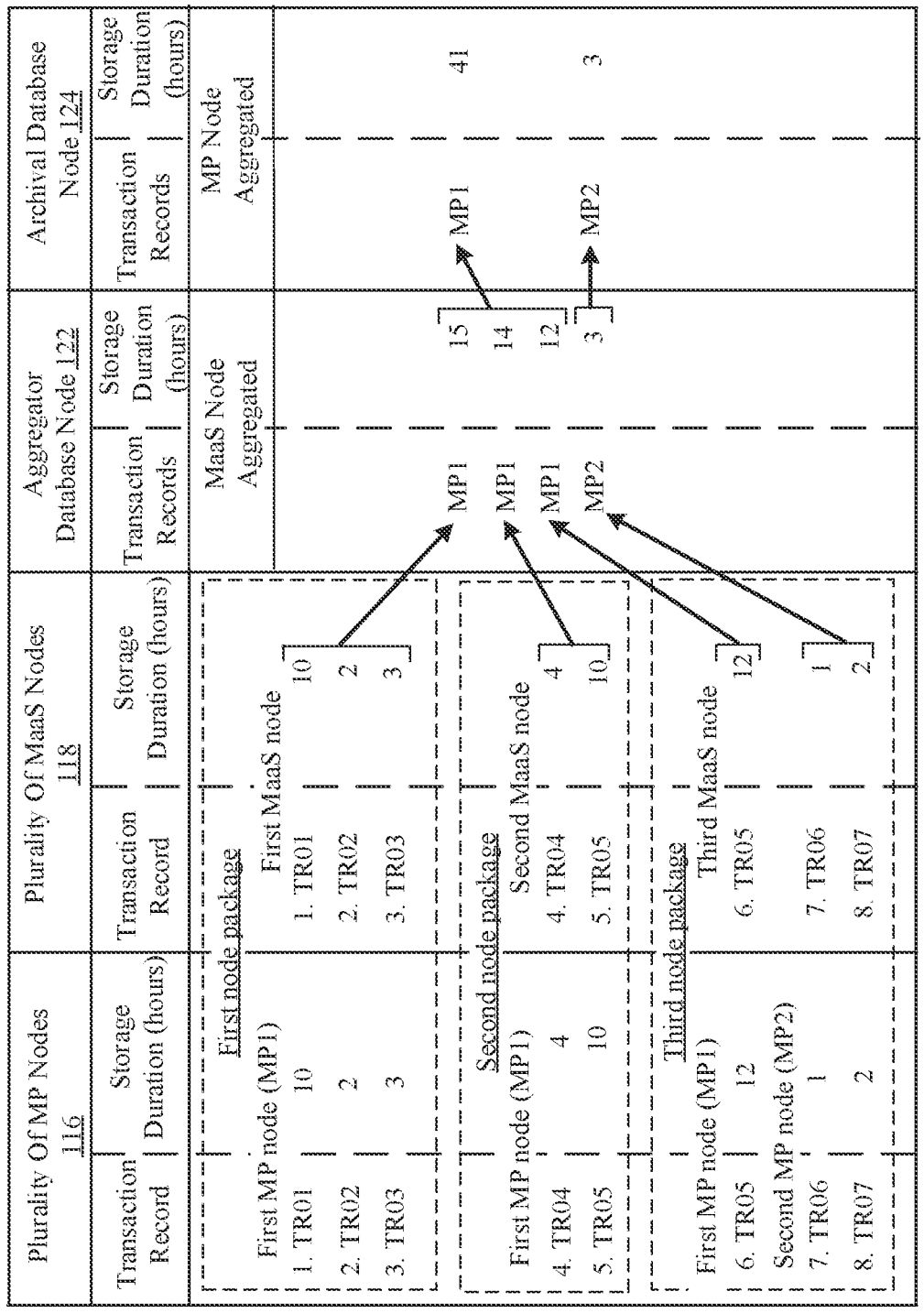
FIG. 5 is an exemplary scenario that depicts aggregation of transaction messages, based on aggregation logic, in accordance with an embodiment of the disclosure.

FIG. 5 is an exemplary scenario that depicts aggregation of transaction records, based on aggregation logic, in accordance with an embodiment of the disclosure. FIG. 5 is explained in conjunction with elements from FIGS. 1, 2, 3, 4A, 4B, and 4C. With reference to FIG. 5, there is shown an exemplary scenario 500. The exemplary scenario 500 depicts aggregation of the transaction records, based on an aggregation logic, in accordance with an embodiment of the disclosure.

The exemplary scenario 500 of FIG. 5 may include the plurality of MP nodes 116A, 116B, . . . 116N, the plurality of MaaS nodes 118A, 118B, . . . 118N, the aggregator database node 122 and the archival database node 124. The exemplary scenario 500 of FIG. 5 depicts a snapshot of transactions records stored in the plurality of node packages 120 (such as the first node package, the second node package and a third node package) the aggregator database node 122 and the archival database node 124 at a certain time. The first node package may include, for example, the first subscriber node 114A, the first MP node 116A and the first MaaS node 118A as described, for example, in FIG. 1. The second node package may include, the second subscriber node 114B, the first MP node 116A, and the second MaaS node 118B. The third node package may include a third subscriber node 114C, the first MP node 116A, the second MP node 116B and the third MaaS node 118C. It may be noted that, one or more of the plurality of node packages 120 (shown in FIG. 1) may include a subscriber node, a plurality of MP nodes of the first distributed ledger, and a MaaS node of the second distributed ledger, as shown, for example, in FIG. 5.

A transaction record "TR01", a transaction record "TR02", and transaction record "TR03" may be a part of the first node package. For example, the transaction records "TR01", "TR02" and "TR03" may be at the first MP node 116A. Moreover, a transaction record "TR04", and transaction record "TR05" may be a part of the second node package. For example, the transaction records "TR04" and "TR05" may be at the first MP node 116A, as shown in FIG. 5. Further, for example, a transaction record "TR05", a transaction record "TR06", and transaction record "TR07" may be a part of the third node package. For example, the transaction record "TR05" may be at the first MP node 116A and the transaction records "TR06" and "TR07" may be at the second MP node 116B, as shown in FIG. 5.

At a certain time, when the transaction records "TR01" . . . "TR07" are stored at the plurality of MP nodes, the ownership of the transaction records may be with the plurality of mobility providers (such as the plurality of MP nodes) and the plurality of MaaS nodes 118A, 118B, . . . 118N. In other words, both MP and MaaS nodes may be able to view the transaction records. The first MaaS node 118A of the first node package may receive the transaction records "TR01", "TR02" and "TR03" from the first MP node 116A, as shown in FIG. 5. The second MaaS node 118B of the second node package may receive the transaction records "TR04" and "TR05" from the first MP node 116A. The third MaaS node 118C may receive the transaction record "TR05" from the first MP node 116A and the transaction records "TR06" and "TR07" from the second MP node 116B, as shown in FIG. 5. Therefore, copy of all the transaction records may be transferred from the plurality of MP nodes to the plurality of MaaS nodes 118A, 118B, . . . 118N, as shown in FIG. 5. At current stage, the ownership of the transaction records "TR01" . . . "TR07" may be with the plurality of MaaS nodes 118A, 118B, . . . 118N. Further, the plurality of MaaS nodes 118A, 118B, . . . 118N may summarize the transaction records from the plurality of node packages 120. The transaction records may be summarized based on the node package of the plurality of node packages 120.

In embodiment, the summarized transaction records may be further received by the aggregator database node 122. The transaction records may be aggregated based on the retention threshold and/or the storage duration (i.e. described, for example, FIGS. 4A-4C), and further based on each of the plurality of MP nodes. The aggregator database node 122 may store the aggregated transaction records for different MP nodes associated with each node package. For example, as shown in FIG. 5, the aggregator database node 122 may store the aggregated transaction record for the first MP node 116A (i.e. associated with the first mobility provider) of the first node package as "MP1 with 15 hours storage duration", which may aggregate multiple records (i.e. TR01—10 hours, TR02—2 hours and TR03—3 hours) stored in the first Maas node 118A. Similarly, for example, the aggregator database node 122 may further store the aggregated transaction record for the first MP node 116A of the second node package as "MP1 with 14 hours storage duration", which may aggregate multiple records (i.e. TR04—4 hours and TR05—10 hours) stored in the first Maas node 118A. Similarly, for example, the aggregator database node 122 may further store the aggregated transaction record for the first MP node 116A of the third node package as "MP1 with 12 hours storage duration". The aggregator database node 122 may further store the aggregated transaction record for the second MP node 116B (i.e. associated with the second mobility provider) of the third node package as "MP2 with 3 hours storage duration", which may aggregate multiple records (i.e. TR06—1 hours and TR07—2 hours) stored in the first Maas node 118A. In addition to the retention threshold and/or the storage duration, the aggregation of the transaction records may be further based on other parameters, such as data support of the subscribed users. In some embodiments, only selected transaction records may be aggregated and archived, based on a business logic (for example selected for a specific day or week or selected based on completion of settlements).

In an embodiment, in addition to the storage of aggregated transaction records (such as "MP1 with 15 hours storage duration", "MP1 with 14 hours storage duration", "MP1 with 12 hours storage duration", and "MP2 with 3 hours storage duration", as shown in FIG. 5), the aggregator database node 122 may also store the exact copy of all or selected transaction records stored at the corresponding MaaS node of the plurality of MaaS nodes 118A, 118B, . . . 118N for each MP node within each of the plurality of node packages 120. In other words, for example, as the first MaaS node 118A stores transaction records "TR01", "TR02" and "TR03" (i.e. received from the first MP node 116A), similarly the aggregator database node 122 may also store the exact copy of the transaction records "TR01", "TR02" and "TR03" (i.e. received from the first MaaS node 118A), in addition to the storage of the aggregated transaction records (such as "MP1 with 15 hours storage duration"). It may be noted that, the storage of the exact copy of the transaction records (i.e. received from the corresponding MaaS node) in the aggregator database node 122 is explicitly not shown in FIG. 5, however described and shown, for example, in FIGS. 4B-4C. Similarly, in addition to the storage of aggregated transaction record, the aggregator database node 122 may store all (or selected) transaction records (i.e. in same form) that are stored at different MP nodes and Maas nodes for each of the plurality of node packages 120.

In an embodiment, when the transaction records are stored at the aggregator database node 122, the ownership of the transaction records may be with the plurality of MaaS nodes 118A, 118B, . . . 118N. The plurality of MaaS nodes 118A, 118B, . . . 118N may share the aggregated transaction records with the plurality of mobility players. The revenue sharing between the mobility providers may be based on the aggregated transaction records. Further, the revenue sharing may be performed based on the smart contract or other protocols of the distributed ledger technology, when the aggregator database node 122 is the distributed ledger based database. In some embodiments, the revenue sharing may be performed based on regular sharing mechanism like file exchange or by utilization of application programming interface (API), when the aggregator database node 122 is the non-distributed ledger based database.

As shown in FIG. 5, the aggregated transaction records may further be received by the archival database node 124 from the aggregator database node 122. The archival database node 124 may receive the summarized transaction records, instead of the individual transaction records "TR01", . . . "TR07" (for example as shown in 4C where the archival database node 124 receives individual transaction records "TR09-TR13" based on the second data retention). For example, the archival database node 124 may receive the aggregated transaction records associated with the first MP node 116A (as "MP1") from the aggregator database node 122. The archival database node 124 may also receive the aggregated transaction records associated with the second MP node 116B (as "MP2") from the aggregator database node 122. As shown in FIG. 5 (for example), the archival database node 124 may receive and store the aggregated transaction record for the first MP node 116A as "MP1—41 hours storage duration", which may aggregate multiple aggregated records (i.e. MP1—15 hours, MP1—14 hours, and MP1—12 hours) stored in the aggregator database node 122. Similar, as shown in FIG. 5 (for example), the archival database node 124 may receive and store the aggregated transaction record for the second MP node 116B as "MP2—3 hours storage duration".

In an embodiment, in addition to the storage of aggregated transaction records (such as "MP1—41 hours storage duration", and "MP2—3 hours storage duration", as shown in FIG. 5), the archival database node 124 may also store the exact copy of all or selected transaction records stored at the aggregator database node 122 for each MP node associated with each of the plurality of node packages 120. In other words, for example, as the first MaaS node 118A stores transaction records "TR01", "TR02" and "TR03 (i.e. received from the first MP node 116A), similarly the archival database node 124 may also store the exact copy of the transaction records "TR01", "TR02" and "TR03 (i.e. received from the aggregator database node 122), in addition to the storage of the aggregated transaction records (such as "MP1—41 hours storage duration"). It may be noted that, the storage of the exact copy of the transaction records (i.e. received from the aggregator database node 122) in the archival database node 124 is explicitly not shown in FIG. 5, however described and shown, for example, in FIGS. 4B-4C. Similarly, in addition to the storage of aggregated transaction records, the archival database node 124 may store all (or selected) transaction records (i.e. in same form) stored at different MP nodes and Maas nodes for each of the plurality of node packages 120.

Therefore, during an audit process, the individual transaction records for a particular mobility provider (for example, "TR01", "TR02", "TR03", "TR04" "TR05" for MP1 of each node package) and the aggregated transaction record for same mobility provider (for example "MP1—41 hours storage duration") may be retrieved from the archival database node 124, and may be further compared to check the correctness (i.e. matching or checksum verification) of the stored transaction records. For example, but not limited to, the sum of the storage duration (in hours/days) of each individual transaction record (for example, "TR01", "TR02", "TR03", "TR04" "TR05" for MP1 of each node package) may be compared with the aggregated storage duration (i.e. "41 hours shown in FIG. 5) of the aggregated transaction record stored at the archival database node 124 to check the correctness (i.e. checksum verification) for same mobile player (i.e. "MP1").

In an embodiment, the archival database node 124 may be the distributed ledger based database (i.e. online or onchain mode), and the ownership of the archival database node 124 may be managed by the mobility providers. Thus, the transaction records on the archival database node 124 may be utilized by the mobility providers for revenue sharing. In some embodiments, the archival database node 124 may be the non-distributed ledger based database (i.e. offline or offchain mode). In such a case, the mobility providers may query the archival database node 124 and access the transaction records for the revenue sharing. Therefore, each mobility player may access collated or aggregated transaction records corresponding to each MP node of the plurality of MP nodes for the revenue sharing. It may be noted that the implementation of the aggregation and the revenue sharing between the mobility providers based on time period (i.e. the first storage duration, the second storage duration, and/or retention thresholds in hours or days) described/shown in FIG. 5, is merely an example. The disclosed system may perform the aggregation and the revenue sharing among different mobility providers based on cost values associated with the transaction records (for example the cost related to a trip).

Figure 6:
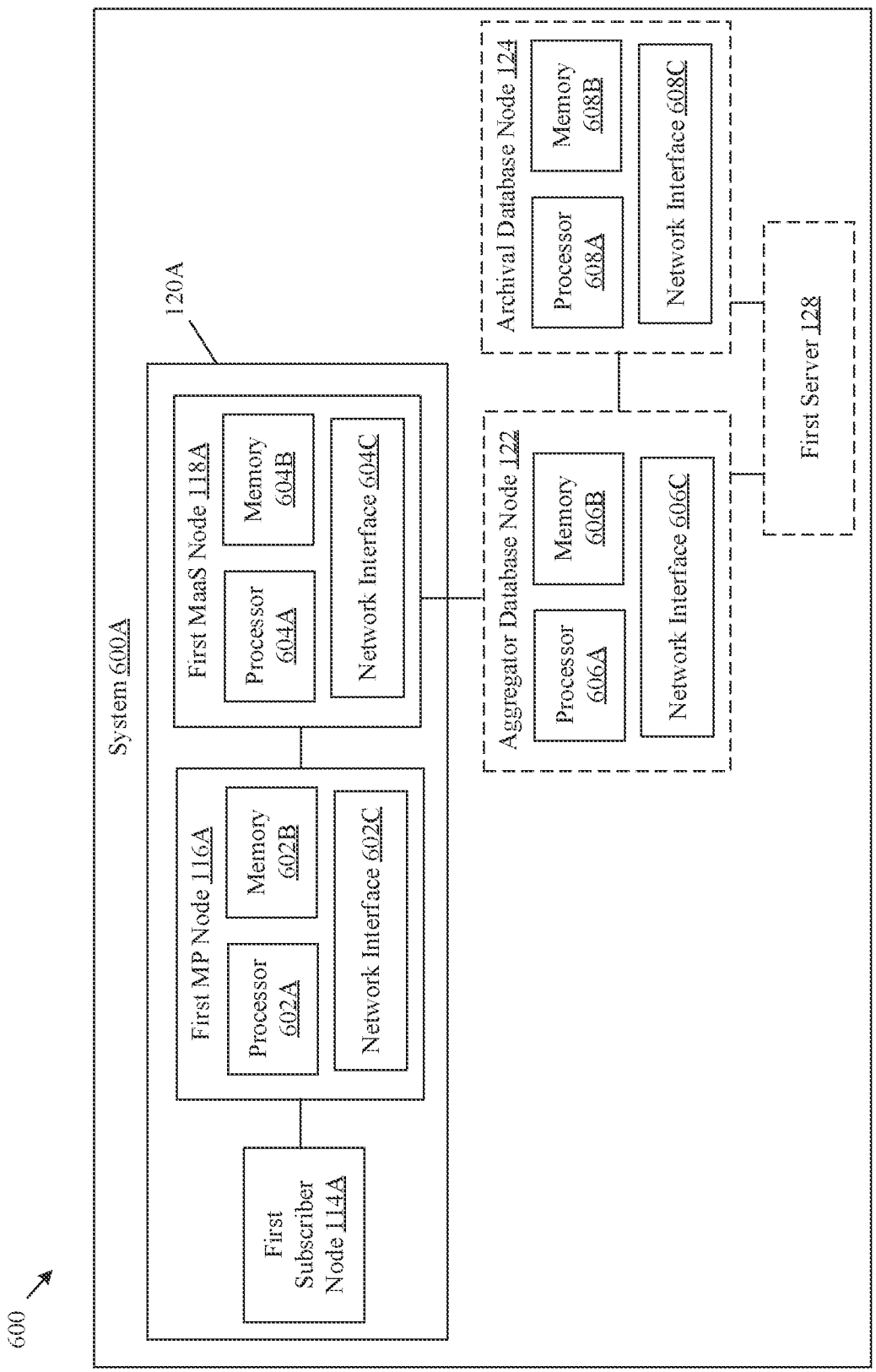
FIG. 6 is a block diagram of a system for support of largescale transactions and node archival on a MaaS platform based on common database architecture, in accordance with an embodiment of the disclosure.

FIG. 6 is a block diagram of a system for support of largescale transactions and node archival on a MaaS platform based on common database architecture, in accordance with an embodiment of the disclosure. FIG. 6 is explained in conjunction with elements from FIGS. 1, 2, 3, 4A, 4B, 4C and 5. With reference to FIG. 6, there is shown a block diagram of a system 600A. The system 600A may include the first subscriber node 114A, the first MP node 116A, the first MaaS node 118A, the aggregator database node 122, the archival database node 124, and the first server 128.

The first MP node 116A may include a processor 602A, memory 602B, and a network interface 602C. The first MaaS node 118A may include a processor 604A, memory 604B, and a network interface 604C. Moreover, the aggregator database node 122 may include a processor 606A, memory 606B, and a network interface 606C. The archival database node 124 may further include processor 608A, memory 608B, and a network interface 608C. Though not shown, each of the first server 128 and the first subscriber node 114 may also include a processor, memory, and a network interface.

The first subscriber node 114A, the first MP node 116A, and the first MaaS node 118A may form the first node package 120A of the plurality of node packages 120. The aggregator database node 122 may be communicatively coupled to the first MaaS node 118A. The archival database node 124 may be communicatively coupled to the aggregator database node 122. Further, the first server 128 may be communicatively coupled to each of the aggregator database node 122 and the archival database node 124.

The processor 604A may include suitable logic, circuitry, and/or interfaces that may be configured to execute a set of instructions stored in the memory 604B. The processor 604A may be configured to execute program instructions associated with different operations to be executed by the first MaaS node 118A or any other MAAS node. For example, some of the operations may include selection of the first set of transaction records from the first plurality of transaction records stored in the first MaaS node 118A and transmission of the selected first set of transaction records to the aggregator database node 122 for the storage. The processor 604A may further be configured to control the selection of the second set of transaction records from the third set of transaction records stored on the aggregator database node and control the transmission of the selected second set of transaction records to the archival database node 124 for the storage. The processor 604A may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors. The functions of the processor 602A, the processor 606A and the processor 608A may be same as the functions of the processor 604A of the first MaaS node 118A described, for example, in FIG. 6 or in FIGS. 4A-4C. Therefore, the description of the processor 602A, the processor 606A and the processor 608A is omitted from the disclosure for the sake of brevity.

The memory 604B may include suitable logic, circuitry, and/or interfaces that may be configured to store the one or more instructions to be executed by the processor 604A. The memory 604B may be configured to store the first plurality of transaction records. Examples of implementation of the memory 604B may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card. The functions of the memory 602B, the memory 606B and the memory 608B may be same as the functions of the memory 604B described, for example, in FIG. 6. Therefore, the description of the memory 602B, the memory 606B and the memory 608B is omitted from the disclosure for the sake of brevity.

The network interface 604C may include suitable logic, circuitry, and interfaces that may be configured to facilitate communication between the corresponding processors of the first MaaS node 118A, the first MP node 116A, and the aggregator database node 122 (and the archival database node 124), via a communication network (not shown in FIG. 6). The network interface 604C may be implemented by use of various known technologies to support wired or wireless communication of the first MaaS node 118A with the communication network. The network interface 604C may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 604C may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The functions of the network interface 602C, the network interface 606C and the network interface 608C may be same as the functions of the network interface 604C described, for example, in FIG. 6. Therefore, the description of the network interface 602C, the network interface 606C, and the network interface 608C is omitted from the disclosure for the sake of brevity.

Figure 7:
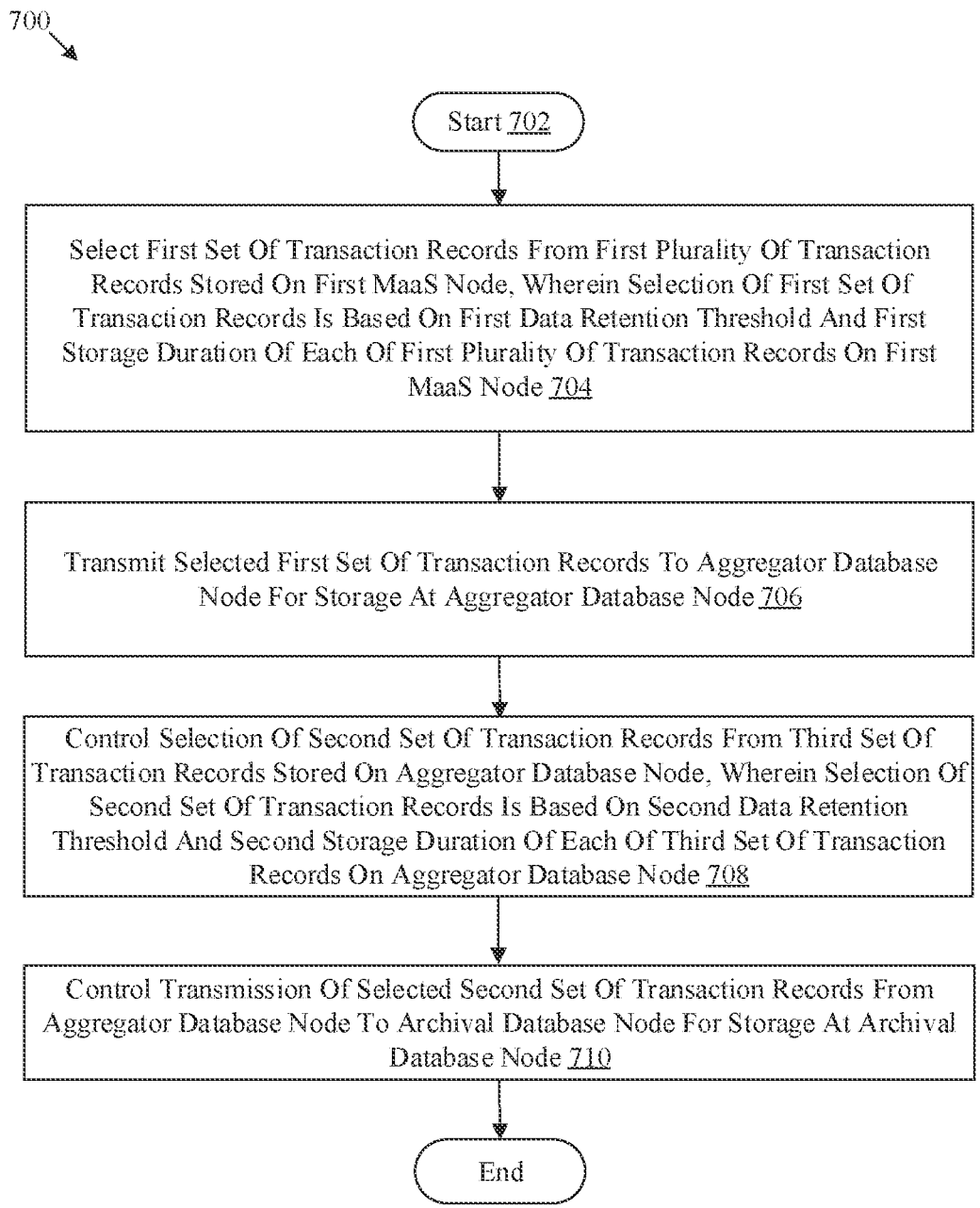
FIG. 7 illustrates an exemplary flowchart of a method for support of largescale transactions and node archival on a MaaS platform based on common database architecture, in accordance with an embodiment of the disclosure.

FIG. 7 illustrates an exemplary flowchart of a method for support of largescale transactions and node archival on a MaaS platform based on common database architecture, in accordance with an embodiment of the disclosure. FIG. 6 is described in conjunction with elements from FIGS. 1, 2, 3, 4A, 4B, 4C, 5 and 6. With reference to FIG. 7, there is shown a flowchart 700. The exemplary method of the flowchart 700 may be executed by any computing system, for example, by the first MaaS node 118A or other Maas Node of FIG. 1. The exemplary method of the flowchart 700 may start at 702 and proceed to 704.

At 704, a first set of transaction records may be selected from a first plurality of transaction records stored on a first MaaS node (such as the first MaaS node 118A), wherein the selection of the first set of transaction records may be based on a first data retention threshold and a first storage duration of each of the first plurality of transaction records on the first MaaS node 118A. In accordance with an embodiment, the processor 604A of the first MaaS node 118A may be configured to select the first set of transaction records from the first plurality of transaction records stored on the first MaaS node 118A. The selection of the first set of transaction records may be based on the first data retention threshold and the first storage duration of each of the first plurality of transaction records on the first MaaS node 118A. In an example, the first data retention threshold may be three days. Each of the first plurality of transaction records may be associated with a transaction message received by a first subscriber node (such as the first subscriber node 114A) of the first node package 120A. The selection of the first set of transaction records is explained, for example, in FIGS. 2 and 4B.

At 706, the selected first set of transaction records may be transmitted to the aggregator database node 122 for storage at the aggregator database node 122. In accordance with an embodiment, the processor 604A of the first MaaS node 118A may be configured to transmit the selected first set of transaction records to the aggregator database node 122 for storage at the aggregator database node 122. The transmission of the selected first set of transaction records to the aggregator database node 122 is described, for example, in FIGS. 2 and 4B.

At 708, a selection of a second set of transaction records from a third set of transaction records stored on the aggregator database node 122 may be controlled. The selection of the second set of transaction records may be based on a second data retention threshold and a second storage duration of each of the third set of transaction records on the aggregator database node 122. In accordance with an embodiment, the processor 604A of the first MaaS node 118A may be configured to control the selection of the second set of transaction records from the third set of transaction records stored on the aggregator database node 122. The third set of transaction records may at least include the first set of transaction records. The selection of the second set of transaction records may be based on the second data retention threshold and the second storage duration of each of the third set of transaction records on the aggregator database node 122. In some embodiments, the second data retention threshold may be greater than the first data retention threshold (e.g. three days). For example, the second data retention threshold may be 60 days. In another embodiment, the second data retention threshold may be less than the first data retention threshold. For example, the second data retention threshold may be one day. The selection of the second set of transaction records is explained, for example, in FIGS. 2 and 4C.

At 710, the transmission of the selected second set of transaction records to an archival database node (such as the archival database node 124) may be controlled for storage at the archival database node 124. In accordance with an embodiment, the processor 604A of the first MaaS node 118A may be configured to control the transmission of the selected second set of transaction records to the archival database node 124 for storage of the second set of transaction records at the archival database node 124. The transmission of the selected second set of transaction records to the archival database node 124 is explained, for example, in FIGS. 2 and 4C.

Although the flowchart 700 is illustrated as discrete operations, such as 704, 706, 708 and 710, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, computer-executable instructions or instructions executable by a machine and/or a computer (for a system, such as the system 600A). The system may include an aggregator database node (such as the aggregator database node 122), an archival database node (such as the aggregator database node 122), and a plurality of node packages (such as the plurality of node packages 120), wherein each node package of the plurality of node packages may include a subscriber node of a first Mobility-as-a-Service (MaaS) network, a Mobility Provider (MP) node of a first distributed ledger, and a MaaS node of a second distributed ledger. The instructions may cause the machine and/or computer to perform operations that may include selection, by a first MaaS node of a first node package of the plurality of node packages, a first set of transaction records from a first plurality of transaction records stored on the first MaaS node. The selection of the first set of transaction records may be based on a first data retention threshold and a first storage duration of each of the first plurality of transaction records on the first MaaS node. Each of the first plurality of transaction records may be associated with a transaction message received by a first subscriber node of the first node package. The operations may further include transmission, by the first MaaS node, the selected first set of transaction records to the aggregator database node for storage at the aggregator database node. The operations may further include control, by the first MaaS node, a selection of a second set of transaction records from a third set of transaction records stored on the aggregator database node. The selection of the second set of transaction records may be based on a second data retention threshold and a second storage duration of each of the first set of transaction records on the aggregator database node. The third set of transaction records stored on the aggregator database node may include at least the first set of transaction records. The operations may further include controlling, by the first MaaS node, a transmission of the selected second set of transaction records to the archival database node for storage at the archival database node.

Exemplary aspects of the disclosure may include a system (such as the system 600A). The system 600A may include a plurality of node packages (such as the plurality of node packages 120). Each of the plurality of node packages 120 (for example, the first node package 120A) may include a subscriber node (e.g., the first subscriber node 114A) of a first MaaS network (such as the first MaaS network 102), a Mobility Provider (MP) node of a first distributed ledger, and a MaaS node of a second distributed ledger. The system 600A may further include an aggregator database node (such as the aggregator database node 122) communicatively coupled to each of the plurality of node packages 120. The system 600A may further include an archival database node (such as the archival database node 124) communicatively coupled to the aggregator database node 122. A first MaaS node (such as the first MaaS node 118A) of the first node package 120A from the plurality of node packages 120 may be configured to select a first set of transaction records from a first plurality of transaction records stored on the first MaaS node 118A. The selection of the first set of transaction records may be based on a first data retention threshold and a first storage duration of each of the first plurality of transaction records on the first MaaS node 118A. Each of the first plurality of transaction records may be associated with a transaction message received by the first subscriber node 114A of the first node package 120A. The first MaaS node 118A may further be configured to transmit the selected first set of transaction records to the aggregator database node 122 for storage at the aggregator database node 122. The first MaaS node 118A may be configured to control a selection of a second set of transaction records from a third set of transaction records stored on the aggregator database node 122. The selection of the second set of transaction records may be based on a second data retention threshold and a second storage duration of each of the first set of transaction records on the aggregator database node 122. The third set of transaction records may at least include the first set of transaction records. Furthermore, the first MaaS node 118A may be configured to control a transmission of the selected second set of transaction records to the archival database node 124 for storage at the archival database node 124.

In accordance with an embodiment, the first MaaS node 118A may be further configured to compare the first storage duration of each of the first plurality of transaction records on the first MaaS node 118A with the first data retention threshold. The first MaaS node 118A may further select the first set of transaction records from the first plurality of transaction records based on the comparison.

In accordance with an embodiment, the first MaaS node 118A may be further configured to control a comparison of the second storage duration of each of the third set of transaction records on the aggregator database node 122 with the second data retention threshold. The first MaaS node 118A may further control a selection of the second set of transaction records from the third set of transaction records based on the comparison.

In accordance with an embodiment, the first MaaS node 118A may be further configured to invalidate the selected first set of transaction records from the first MaaS node 118A based on the transmission of the selected first set of transaction records to the aggregator database node 122.

In accordance with an embodiment, the first MaaS node 118A may be further configured to control an invalidation of the selected second set of transaction records from the aggregator database node 122 based on the transmission of the selected second set of transaction records to the archival database node 124.

In accordance with an embodiment, the subscriber node of each of the plurality of node packages 120 may be associated to the first MaaS network 102 through a plug-in interface. The plug-in interface may include at least one of: a network protocol handler plug-in, security plug-in, a data scheme and data quality check plugin, a monitor and alert plug-in, a transaction management plug-in, a transaction error handling plug-in, or a concurrent thread management plug-in.

In accordance with an embodiment, one or more of the plurality of node packages 120 may include a subscriber node, a plurality of MP nodes (such as the plurality of MP nodes 116A, 116B, . . . 116N) of a first distributed ledger, and a MaaS node of a second distributed ledger.

In accordance with an embodiment, each of the plurality of MP nodes 116A, 116B, . . . 116N may be associated with a separate mobility provider of the first MaaS network 102.

In accordance with an embodiment, the system 600A may further include a first server (such as the first server 128) associated with each of the aggregator database node 122 and the archival database node 124. The first server 128 may be configured to transmit a query for one or more first transaction records stored on the aggregator database node 122, to the aggregator database node 122. The first server 128 may receive the queried one or more first transaction records from the aggregator database node 122. The first server 128 may further verify one or more transactions associated with the queried one or more first transaction records.

In accordance with an embodiment, the first server 128 may be further configured to transmit a query for one or more second transaction records stored on the archival database node 124 to the archival database node 124. The first server 128 may further receive the queried one or more second transaction records, from the archival database node 124. The first server 128 may further display statistical information associated with the queried one or more second transaction records.

In accordance with an embodiment, the system may further include a cache database node (such as the cache database node 126). The cache database node 126 may be further configured to receive the queried one or more second transaction records, from the archival database node 124. The cache database node 126 store the received one or more second transaction records on the cache database node 126. The cache database node 126 may receive a query for one or more third transaction records from the one or more second transaction records stored on the cache database node, from the first server 128. The cache database node 126 may transmit the one or more third transaction records, to the first server 128, based on the received query for the one or more third transaction records.

In accordance with an embodiment, the aggregator database node 122 and the archival database node 124 may be distributed ledger nodes related to the first MaaS network 102. In accordance with an embodiment, the aggregator database node 122 and the archival database node 124 may be non-distributed ledger nodes related to the first MaaS network 102.

In accordance with an embodiment, the second data retention threshold may be greater than the first data retention threshold. In accordance with an embodiment, the second data retention threshold may be lower than the first data retention threshold.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:
1. A system, comprising:
a plurality of node packages, wherein
each node package of the plurality of node packages includes a subscriber node of a first Mobility-as-a-Service (MaaS) network, and a MaaS node; and
a first subscriber node of a first node package of the plurality of node packages receives a transaction message;
an aggregator database node communicatively coupled to each of the plurality of node packages; and
an archival database node communicatively coupled to the aggregator database node, wherein a first MaaS node of the first node package of the plurality of node packages is configured to:
select a first set of transaction records from a first plurality of transaction records stored on the first MaaS node, wherein
a transaction record of the first plurality of transaction records is included in a first set of state objects,
a state object in the first set of state objects includes at least a first smart contract,
the selection of the first set of transaction records is based on a first data retention threshold and a first storage duration of each of the first plurality of transaction records on the first MaaS node, and each of the first plurality of transaction records is associated with the transaction message received by the first subscriber node of the first node package;

transmit the selected first set of transaction records with the first set of state objects to the aggregator database node for storage at the aggregator database node;

invalidate the selected first set of transaction records from the first MaaS node based on the transmission of the selected first set of transaction records to the aggregator database node by the first smart contract included in the transmitted first set of state objects;

control a selection, by the aggregator database node, of a second set of transaction records from a third set of transaction records stored on the aggregator database node, where the selected second set of transaction records is generated by a second smart contract from the second set of state objects, wherein
- a transaction record of the third set of transaction records is included in a second set of state objects,
- a state object in the second set of state objects includes at least the second smart contract,
- the selection of the second set of transaction records is based on a second data retention threshold and a second storage duration of each of the third set of transaction records on the aggregator database node, and
- the third set of transaction records stored on the aggregator database node comprises at least the first set of transaction records; and control a transmission of the selected second set of transaction records to the archival database node, where the selected second set of transaction records is generated by the second smart contract from the second set of state objects, to minimize a delay in processing of transactions associated with transaction records stored on the first MaaS node for storage at the archival database node.

2. The system according to claim 1, wherein the first MaaS node is further configured to:
compare the first storage duration of each of the first plurality of transaction records on the first MaaS node with the first data retention threshold; and
select the first set of transaction records from the first plurality of transaction records based on the comparison.

3. The system according to claim 1, wherein the first MaaS node is further configured to:
control a comparison of the second storage duration of each of the third set of transaction records on the aggregator database node with the second data retention threshold; and
control a selection of the second set of transaction records from the third set of transaction records based on the comparison.

4. The system according to claim 1, wherein the first MaaS node is further configured to control an invalidation of the selected second set of transaction records from the aggregator database node based on the transmission of the selected second set of transaction records to the archival database node.

5. The system according to claim 1, wherein the subscriber node of each of the plurality of node packages is associated to the first MaaS network through a plug-in interface, wherein the plug-in interface comprises at least one of:

a network protocol handler plug-in,
security plug-in,
a data scheme and data quality check plugin,
a monitor and alert plug-in,
a transaction management plug-in,
a transaction error handling plug-in, or
a concurrent thread management plug-in.

6. The system according to claim 1, wherein one or more of the plurality of node packages comprise the subscriber node, a plurality of MP nodes of a first distributed ledger, and the MaaS node of a second distributed ledger.

7. The system according to claim 6, wherein each of the plurality of MP nodes is associated with a separate mobility provider of the first MaaS network.

8. The system according to claim 1, further comprising a first server associated with each of the aggregator database node and the archival database node, wherein the first server is configured to:
transmit, to the aggregator database node, a query for one or more first transaction records stored on the aggregator database node;
receive, from the aggregator database node, the queried one or more first transaction records; and
verify one or more transactions associated with the queried one or more first transaction records.

9. The system according to claim 8, wherein the first server is further configured to:
transmit, to the archival database node, a query for one or more second transaction records stored on the archival database node; and
receive, from the archival database node, the queried one or more second transaction records; and
display statistical information associated with the queried one or more second transaction records.

10. The system according to claim 9, further comprising a cache database node, wherein the cache database node is further configured to:
receive, from the archival database node, the queried one or more second transaction records;
store the received one or more second transaction records on the cache database node;
receive, from the first server, a query for one or more third transaction records from the one or more second transaction records stored on the cache database node; and
transmit, to the first server, the one or more third transaction records based on the received query for the one or more third transaction records.

11. The system according to claim 1, wherein the aggregator database node and the archival database node are distributed ledger nodes related to the first MaaS network.

12. The system according to claim 1, wherein the aggregator database node and the archival database node are non-distributed ledger nodes related to the first MaaS network.

13. The system according to claim 1, wherein the second data retention threshold is greater than the first data retention threshold.

14. The system according to claim 1, wherein the second data retention threshold is lower than the first data retention threshold.

15. A method, comprising:
in a system comprising
a plurality of node packages, wherein
each node package of the plurality of node packages includes a subscriber node of a first Mobility-as-a-Service (MaaS) network, and a MaaS node; and a first subscriber node of a first node package of the plurality of node packages receives a transaction message;

an aggregator database node communicatively coupled to each of the plurality of node packages; and an archival database node communicatively coupled to the aggregator database node:

selecting, by a first MaaS node of the first node package of the plurality of node packages, a first set of transaction records from a first plurality of transaction records stored on the first MaaS node, wherein a transaction record of the first plurality of transaction records is included in a first set of state objects, a state object in the first set of state objects includes at least a first smart contract, the selection of the first set of transaction records is based on a first data retention threshold and a first storage duration of each of the first plurality of transaction records on the first MaaS node, and each of the first plurality of transaction records is associated with the transaction message received by the first subscriber node of the first node package;

transmitting, by the first MaaS node, the selected first set of transaction records with the first set of state objects to the aggregator database node for storage at the aggregator database node;

invalidating, by the first MaaS node, the selected first set of transaction records from the first MaaS node based on the transmission of the selected first set of transaction records to the aggregator database node by the first smart contract included in the transmitted first set of state objects;

controlling, by the first MaaS node, a selection, by the aggregator database node, of a second set of transaction records from a third set of transaction records stored on the aggregator database node, where the selected second set of transaction records is generated by a second smart contract from the second set of state objects, wherein a transaction record of the third set of transaction records is included in a second set of state objects, a state object in the second set of state objects includes at least the second smart contract, the selection of the second set of transaction records is based on a second data retention threshold and a second storage duration of each of the third set of transaction records on the aggregator database node, and the third set of transaction records stored on the aggregator database node comprises at least the first set of transaction records; and controlling, by the first MaaS node, a transmission of the selected second set of transaction records to the archival database node, where the selected second set of transaction records is generated by the second smart contract from the second set of state objects, to minimize a delay in processing of transactions associated with transaction records stored on the first MaaS node for storage at the archival database node.

16. The method according to claim 15, further comprising:

comparing, by the first MaaS node, the first storage duration of each of the first plurality of transaction records on the first MaaS node with the first data retention threshold; and selecting, by the first MaaS node, the first set of transaction records from the first plurality of transaction records based on the comparison.

17. The method according to claim 15, further comprising:

controlling, by the first MaaS node, a comparison of the second storage duration of each of the third set of transaction records on the aggregator database node with the second data retention threshold; and controlling, by the first MaaS node, a selection of the second set of transaction records from the third set of transaction records based on the comparison.

18. A non-transitory computer-readable medium having stored thereon, computer-executable instructions that when executed by a system including an aggregator database node, an archival database node, and a plurality of node packages, wherein each node package of the plurality of node packages includes a subscriber node of a first Mobility-as-a-Service (MaaS) network, and a MaaS node, causes the system to execute operations, the operations comprising:

selecting, by a first MaaS node of a first node package of the plurality of node packages, a first set of transaction records from a first plurality of transaction records stored on the first MaaS node, wherein a transaction record of the first plurality of transaction records is included in a first set of state objects, a state object in the first set of state objects includes at least a first smart contract, the selection of the first set of transaction records is based on a first data retention threshold and a first storage duration of each of the first plurality of transaction records on the first MaaS node, a first subscriber node of the first node package receives a transaction message, and each of the first plurality of transaction records is associated with the transaction message received by the first subscriber node of the first node package;

transmitting, by the first MaaS node, the selected first set of transaction records with the first set of state objects to the aggregator database node for storage at the aggregator database node;

invalidating, by the first MaaS node, the selected first set of transaction records from the first MaaS node based on the transmission of the selected first set of transaction records to the aggregator database node by the first smart contract included in the transmitted first set of state objects;

controlling, by the first MaaS node, a selection, by the aggregator database node, of a second set of transaction records from a third set of transaction records stored on the aggregator database node, where the selected second set of transaction records is generated by a second smart contract from the second set of state objects, wherein a transaction record of the third set of transaction records is included in a second set of state objects, a state object in the second set of state objects includes at least the second smart contract, the selection of the second set of transaction records is based on a second data retention threshold and a second storage duration of each of the third set of transaction records on the aggregator database node, and the third set of transaction records stored on the aggregator database node comprises at least the first set of transaction records; and controlling, by the first MaaS node, a transmission of the selected second set of transaction records to the archival database node, where the selected second set of transaction records is generated by the second smart contract from the second set of state objects, to minimize a delay in processing of transactions associated with transaction records stored on the first MaaS node for storage at the archival database node.

\* \* \* \* \*